US011074492B2

United States Patent
Lele et al.

(10) Patent No.: US 11,074,492 B2
(45) Date of Patent: Jul. 27, 2021

(54) METHOD AND APPARATUS FOR PERFORMING DIFFERENT TYPES OF CONVOLUTION OPERATIONS WITH THE SAME PROCESSING ELEMENTS

(71) Applicant: Altera Corporation, San Jose, CA (US)

(72) Inventors: Meghan Lele, Toronto (CA); Davor Capalija, Etobicoke (CA); Andrew Chaang Ling, Toronto (CA)

(73) Assignee: Altera Corporation, San Jose, CA (US)

( * ) Notice: Subject to any disclaimer, the term of this patent is extended or adjusted under 35 U.S.C. 154(b) by 955 days.

(21) Appl. No.: 15/367,101

(22) Filed: Dec. 1, 2016

(65) Prior Publication Data
US 2018/0032857 A1 Feb. 1, 2018

Related U.S. Application Data

(63) Continuation-in-part of application No. 15/017,597, filed on Feb. 6, 2016, which is a continuation-in-part of application No. 14/879,928, filed on Oct. 9, 2015.
(Continued)

(51) Int. Cl.
*G06F 1/14* (2006.01)
*G06N 3/04* (2006.01)
(Continued)

(52) U.S. Cl.
CPC ............. *G06N 3/04* (2013.01); *G06N 3/0454* (2013.01); *G06N 3/063* (2013.01); *G06N 3/084* (2013.01)

(58) Field of Classification Search
CPC ........ G06N 3/04; G06N 3/0454; G06N 3/063; G06N 3/084
(Continued)

(56) References Cited

U.S. PATENT DOCUMENTS 6,466,961 B1 * 10/2002 Miller ...................... G01J 3/26
708/816
6,993,204 B1 * 1/2006 Yahil ......................... G06T 5/20
382/205
(Continued)

FOREIGN PATENT DOCUMENTS

| CN | 103674244 | 3/2014 |
| CN | 104866900 | 8/2015 |
| CN | 105491269 | 4/2016 |

OTHER PUBLICATIONS

Du, et al, "ShiDianNao", Proceedings of the 42nd Annual Int'l Symposium on Computer Architecture, Jun. 13, 2015, pp. 92-104, NY, NY, USA.
(Continued)

*Primary Examiner* — Brandon S Cole

(57) ABSTRACT

A method for implementing a convolutional neural network (CNN) accelerator on a target includes utilizing one or more processing elements to perform convolution. A configuration of the CNN accelerator is modified to change filters implemented by the CNN accelerator and to change formatting of output data. The one or more processing elements are utilized to perform one of deconvolution and backpropagation convolution in response to the change in the filters and formatting of the output data.

19 Claims, 25 Drawing Sheets

Related U.S. Application Data

(60) Provisional application No. 62/379,718, filed on Aug. 25, 2016, provisional application No. 62/238,598, filed on Oct. 7, 2015.

(51) Int. Cl.
  *G06T 7/00* (2017.01)
  *G06K 9/62* (2006.01)
  *G06N 3/063* (2006.01)
  *G06N 3/08* (2006.01)

(58) Field of Classification Search
  USPC .................................................. 706/1–62
  See application file for complete search history.

(56) References Cited

U.S. PATENT DOCUMENTS

| | | | | |
|---|---|---|---|---|
| 7,496,236 | B2 | 2/2009 | Fogg | |
| 2007/0047802 | A1 | 3/2007 | Puri | |
| 2007/0211845 | A1* | 9/2007 | Nishide | A61B 6/04 378/4 |
| 2009/0265109 | A1* | 10/2009 | Truffert | G01V 3/38 702/5 |
| 2010/0098340 | A1* | 4/2010 | Zomet | H04N 1/387 382/206 |
| 2010/0201865 | A1* | 8/2010 | Han | H04N 5/23229 348/362 |
| 2010/0214936 | A1* | 8/2010 | Ito | G06K 9/00986 370/252 |
| 2011/0029471 | A1 | 2/2011 | Chakradhar et al. | |
| 2011/0222371 | A1* | 9/2011 | Liu | G01V 13/00 367/76 |
| 2012/0056800 | A1* | 3/2012 | Williams | G06F 3/011 345/156 |
| 2014/0201126 | A1* | 7/2014 | Zadeh | A61B 5/4803 706/52 |
| 2014/0364721 | A1* | 12/2014 | Lee | A61B 5/4836 600/411 |
| 2015/0146046 | A1* | 5/2015 | Ogasahara | H04N 5/357 348/241 |
| 2015/0170021 | A1* | 6/2015 | Lupon | G06N 3/063 706/15 |
| 2015/0238148 | A1* | 8/2015 | Georgescu | A61B 5/7267 600/408 |
| 2015/0278634 | A1* | 10/2015 | Kato | G06K 9/4628 382/197 |
| 2015/0278642 | A1* | 10/2015 | Chertok | G06K 7/1482 382/156 |
| 2015/0306761 | A1* | 10/2015 | O'Connor | G06N 3/008 700/250 |
| 2016/0163035 | A1* | 6/2016 | Chang | G06T 7/0004 382/149 |
| 2016/0242690 | A1* | 8/2016 | Principe | A61B 5/04012 |
| 2016/0350645 | A1 | 12/2016 | Brothers et al. | |
| 2017/0169567 | A1* | 6/2017 | Chefd'hotel | G06N 3/0454 |

OTHER PUBLICATIONS

Extended European Search Report for Patent Application No. 16192364.4, dated May 7, 2017, 13 pages.
Gokhale, et al "A 240 G-ops/s Mobile Coprocessor for Deep Neural Networks", Computer Vision Foundation CVPR2014 Workshop, 6 pages.
Peeman et al, "Memory-centric Accelerator Design for Convolutional Neural Networks", 2013 IEEE 31ST International Conference on Computer Design (ICCD), 2013, pp. 13-19.
Dong Chao, et al., "Accelerating the Super-Resolution Convolutional Neural Network" Sep. 17, 2016 (Sep. 17, 2016), ECCV 2016 Conference, Springer International Publishing, pp. 391-407.
Extended European Search Report for Patent Application No. 174204533.8, dated May 4, 2018, 12 pages.
Jefkine Kafunah, "Backpropagation in Convolutional Neural Networks" DeepGrid—Organic Deep Learning, Nov. 29, 2016 (Nov. 29, 2016), pp. 1-10, retrieved from the internet, URL:http://www.jefkine.com/general/2016/09/05/backpropagation-in-convolutional-neural-networks/.
Jonathan Long, et al, "Fully convolutional networks for semantic segmentation" 2015 IEEE Conference on Computer Vision and Pattern Recognition (CVPR), vol. abs/1411.4038v2, Mar. 8, 2015 (Mar. 8, 2015), pp. 1-10.
Kalin Ovtcharov, et al, Accelerating deep convolutional neural networks using specialized hardware Microsoft White Paper, Feb. 22, 2015 (Feb. 22, 2015) pages, retrieved from the internet, URL:https://www.microsoft.com/en-us/research/wp-content/uploads/2016/02/CNN20Whitepaper.pdf, p. 1-p. 4.
Vincent Dumoulin, et al, "A guide to convolution arithmetic for deep learning" Arxiv Org, Cornell University Library, 201 Olin Librray Cornell Univeristy Ithaca, NY 14853, Mar. 23, 2016 (Mar. 23, 2016).
Zhang Chen et al, Caffeine: Towards uniformed representation and acceleration for deep convolutional neural networks 2016 IEEE/ACM International Conference on Computer-Aided Design (ICCAD), ACM, Nov. 7, 2016 (Nov. 7, 2016), pp. 1-8.
Office Action for U.S. Appl. No. 15/017,597, dated Jul. 5, 2018, 31 pages.
Zhang, et al.; "Optimizing FPGA-based Accelerator Design for Deep Convolutional Neural Networks"; FPGA'15, Feb. 22-24, 2015, Monterey, California, USA—10 pages.
Ovtcharov, et al.; "Accelerating Deep Convolutional Neural Networks Using Specialized Hardware", Microsoft Research, Feb. 22, 2015; http://research.microsoft.com/apps/pubs/?id=240715; 4 pages.
Krizhevsky, et al.; "ImageNet Classification with Deep Convolutional Networks"; Advances in Neural Information Processing Systems 25; 2012; pp. 1106-1114.

* cited by examiner

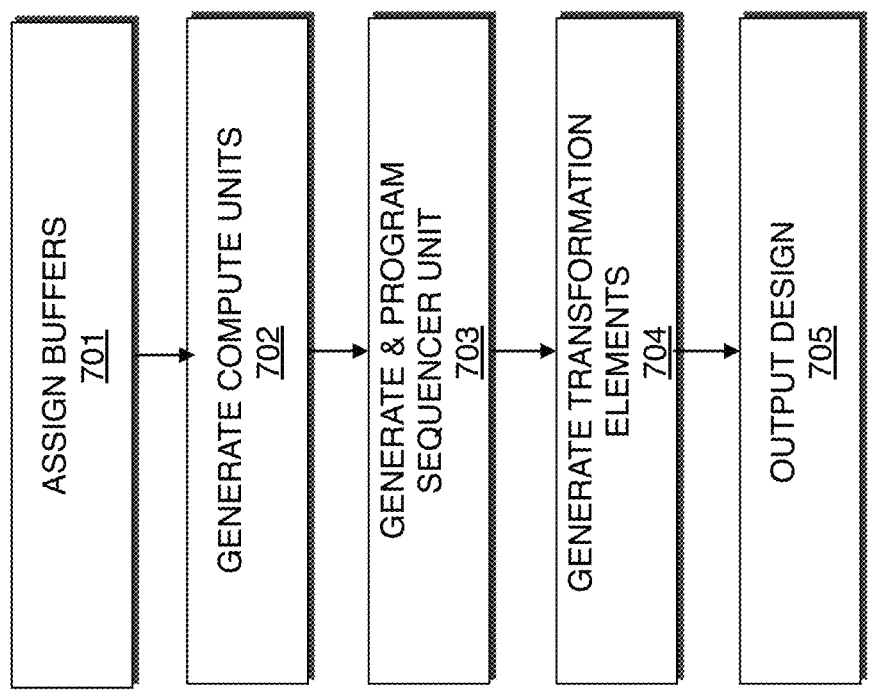

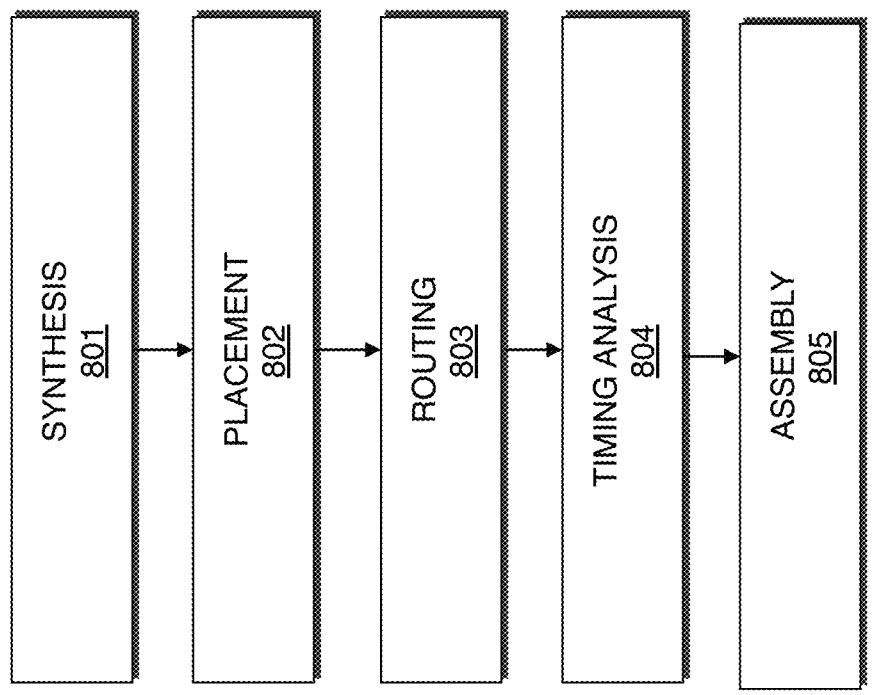

METHOD AND APPARATUS FOR PERFORMING DIFFERENT TYPES OF CONVOLUTION OPERATIONS WITH THE SAME PROCESSING ELEMENTS

RELATED APPLICATION

This application claims benefit and priority to Provisional U.S. Patent Application No. 62/379,718 filed Aug. 25, 2016 entitled "A Method and Architecture for Computing Three Convolution Types (Convolution, Deconvolution and Convolution Backpropagation) Using a Generic Dot-Product Engine", the full and complete subject matter of which is hereby expressly incorporated by reference in its entirety. This application is also a continuation-in-part of, and claims the benefit under Title 35, United States Code, Section 120 of co-pending U.S. application Ser. No. 15/017,597 filed on Feb. 6, 2016 and entitled "Method and Apparatus for Implementing Layers on a Convolutional Neural Network Accelerator" which is a continuation-in-part of, and claims the benefit under Title 35, United States Code, Section 120 of co-pending U.S. application Ser. No. 14/879,928 filed on Oct. 9, 2015 and entitled "Method and Apparatus for Designing and Implementing a Convolution Neural Net Accelerator". U.S. application Ser. No. 15/017,597 also claims benefit and priority to Provisional U.S. Patent Application No. 62/238,598 filed Oct. 7, 2015 entitled "Method and Apparatus for Designing and Implementing Standard and Fully-Connected Convolution Layers on a Convolutional Neural Network Accelerator", the full and complete subject matter of which is hereby expressly incorporated by reference in its entirety.

FIELD

Embodiments of the present disclosure relate to tools for designing systems on target devices and hardware accelerators for performing different types of convolution. More specifically, embodiments of the present disclosure relate to a method and apparatus for performing different types of convolution operations with the same processing elements.

BACKGROUND

As images and videos have become more ubiquitous on the Internet, the need arises for algorithms with the capability to efficiently analyze their semantic content for various applications, including search and summarization. Convolutional neural networks (CNNs) have been shown to be effective tools for performing image recognition, detection, and retrieval. CNNs may be scaled up and configured to support large labeled datasets that are required for the learning process. Under these conditions, CNNs have been found to be successful in learning complex and robust image features.

A CNN is a type of feed-forward artificial neural network where individual neurons are tiled in a manner such that they respond to overlapping regions in a visual field. CNNs are inspired by the behavior of optic nerves in living creatures. CNNs process data with multiple layers of neuron connections to achieve high accuracy in image recognition. Developments in multi-layer CNNs have led to improvement in the accuracy of complex recognition tasks such as large-category image classification, automatic speech recognition, as well as other data classification/recognition tasks.

The limitations in computing power of a single processor have led to the exploration of other computing configurations to meet the demands for supporting CNNs. Among the areas of exploration, CNN accelerators which utilize hardware specialization in the form of general purpose computing on graphics processing units (GPGPUs), multi-core processors, field programmable gate arrays (FPGAs), and application specific integrated circuits (ASICs) have been researched.

SUMMARY

According to an embodiment of the present disclosure, a methodology for designing and implementing a convolutional neural network (CNN) accelerator is disclosed. The methodology utilizes an electronic design automation (EDA) tool that generates a design for the CNN accelerator in response to features of a CNN accelerator which may include characteristics and parameters of the CNN accelerator specified by a user, and available resources on a target selected by the user. The target may include one or more target devices of one or more types. The EDA tool assigns resources on the target to implement the CNN accelerator to achieve high performance. For example, resources on the target are assigned to implement appropriately sized buffers to handle the types and sizes of images to be processed by the CNN accelerator. Resources on the target are also assigned to implement the appropriate types and number of computation units, such as processing elements, to support the type of filters and layers applied by the CNN accelerator. The EDA tool also generates a sequencer unit that is programmed to coordinate the transmission of data to appropriate computation units in order to time multiplex computations on the computation units.

According to an embodiment of the present disclosure, a range of characteristics may be specified by the user to allow the CNN accelerator to execute a plurality of CNN algorithms. In this embodiment, one or more configurable status registers (CSRs) are implemented to allow a user to configure the target to support specified characteristics required for executing one of the plurality of CNN algorithms at runtime, after the CNN accelerator is programmed on the target. When implemented on an field programmable gate array (FPGA), the CSRs effectively allow runtime configuration of the CNN accelerator. This facilitates an FPGA overlay targeted at CNN applications.

According to an embodiment of the present disclosure, a method for implementing a CNN accelerator on a target includes identifying a CNN algorithm to execute on the CNN accelerator. A variation of the CNN accelerator is identified that supports execution of the CNN algorithm. The variation of the CNN may include a specific number or type of convolution layers, pooling layers, filter size, and/or filter coefficient. CSRs on the target device may be set to support the desired variation. When a different CNN algorithm is desired to be executed on the target device, a different variation of the CNN accelerator may be identified that supports the different CNN algorithm. The CSRs on the target device may be set to support the different variation of the CNN accelerator.

According to an embodiment of the present disclosure, a method for implementing a CNN accelerator on a target includes utilizing one or more processing elements to implement a standard convolution layer. A configuration of the CNN accelerator is modified to change a data flow between components on the CNN accelerator. The one or more processing elements are utilized to implement a fully connected layer in response to the change in the data flow.

According to an embodiment of the present disclosure, a CNN accelerator implemented on a target includes a sequencer unit that coordinates a first data flow between components on the target during a first configuration and that coordinates a second data flow between components on the target during a second configuration. The CNN accelerator also includes a plurality of processing elements that implement a standard convolutional layer during the first configuration, and that implement a fully connected layer during the second configuration.

According to an embodiment of the present disclosure, CNN applications requiring implementations of convolution layers, deconvolution layers, and convolution backpropagation layers are implemented using the same processing elements on a CNN accelerator. This reduces hardware costs by allowing the sharing of DDR bandwidth, memory, and logic during different instances of runtime. The deconvolution and backpropagation convolution layers are converted to convolution layers by extracting a plurality of convolution filters from a deconvolution/backpropagation convolution filter, performing a plurality of convolutions with the plurality of convolution filters and input data, and interlacing results generated from the plurality of convolutions to generate an output.

According to an embodiment of the present disclosure, a method for implementing a CNN accelerator on a target includes utilizing one or more processing elements to perform convolution. A configuration of the CNN accelerator is modified to change filters implemented by the CNN accelerator and to change formatting of output data. The one or more processing elements are utilized to perform one of deconvolution and backpropagation convolution in response to the change in the filters and formatting of the output data.

According to an embodiment of the present disclosure, a CNN accelerator implemented on a target includes a sequencer unit that coordinates a first data flow between components on the target during a first configuration and that coordinates a second data flow between components on the target during a second configuration. The CNN accelerator also includes a plurality of processing elements that performs convolution during the first configuration, and that performs one of deconvolution and backpropagation convolution during the second configuration. The CNN accelerator also includes transformation elements that include a convolution filter extraction unit that generates a plurality of convolution filters from a deconvolution/backpropagation convolution filter, and an interlacing unit that interlaces convolution results generated from performing convolution on deconvolution/backpropagation convolution input data using the plurality of convolution filters, to produce deconvolution/backpropagation convolution output data.

BRIEF DESCRIPTION OF THE DRAWINGS

The features and advantages of embodiments of the present disclosure are illustrated by way of example and are not intended to limit the scope of the embodiments of the present disclosure to the particular embodiments shown.

FIG. 6B illustrates an example of reflecting extracted filters according to an embodiment of the present disclosure.

FIG. 6C illustrates an example of performing convolution with extracted convolution filters and interlacing results to generate a deconvolution/convolution backpropagation output according to an embodiment of the present disclosure.

FIG. 7 is a flow chart illustrating a method for generating a design for a CNN accelerator according to an embodiment of the present disclosure.

FIG. 8 is a flow chart illustrating a method for compiling a design for a CNN according to an exemplary embodiment of the present disclosure.

DETAILED DESCRIPTION

In the following description, for purposes of explanation, specific nomenclature a is set forth to provide a thorough understanding of embodiments of the present disclosure. It will be apparent to one skilled in the art that specific details in the description may not be required to practice the embodiments of the present disclosure. In other instances, well-known circuits, devices, procedures, and programs are shown in block diagram form to avoid obscuring embodiments of the present disclosure unnecessarily.

Figure 1:
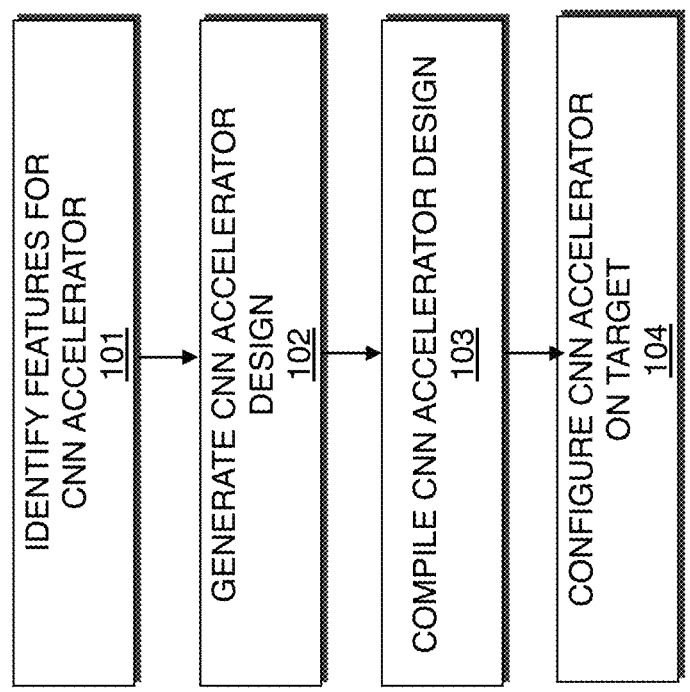
FIG. 1 is a flow chart illustrating a method for designing and implementing a convolutional neural network (CNN) accelerator according to an exemplary embodiment of the present disclosure.

FIG. 1 is a flow chart illustrating a method for designing and implementing a convolutional neural network (CNN) accelerator according to an exemplary embodiment of the present disclosure. The procedures described in FIG. 1 may be performed by an electronic design automation (EDA) tool and an CNN accelerator configuration tool on a computer system. The procedures described may also be performed in combination with other tools or systems. At 101, features of a design for the CNN accelerator are identified. According to an embodiment of the present disclosure, identifying features of the design include identifying characteristics and parameters for the CNN accelerator, and resources available on a target implementing the CNN accelerator. It should be appreciated that when the CNN accelerator is desired to support more than one CNN algorithm, a plurality or range of characteristics and parameters may be identified. For example, the CNN accelerator may support a plurality of convolution, deconvolution, and backpropagation convolution layers. According to an embodiment of the present disclosure, the features of the design for the CNN accelerator may be provided in a high level design language such as OpenCL or other design language.

At 102, a design for the CNN accelerator is generated. According to an embodiment of the present disclosure, an architecture description of the design for the CNN accelerator is generated in response to the features of the CNN accelerator. The design for the CNN accelerator may be optimized for the target implementing the CNN accelerator. In addition to generating a design in response to the features of the CNN accelerator described at 101, additional components may be added to support features that may not be identified at 101. For example, components that support the implementation of additional types of convolution layers identified during runtime of the CNN accelerator may be added to the design. According to an embodiment of the present disclosure, the design for the CNN accelerator may be generated in a high level design language or a hardware description language.

At 103, the design for the CNN accelerator is compiled for the target. According to an embodiment of the present disclosure, compilation involves performing synthesis, placement, routing, and timing analysis procedures on a hardware description language of the design. The compiled design for the CNN accelerator supports a range of CNN variants.

At 104, the CNN accelerator is configured on the target. According to an embodiment of the present disclosure, the target is programmed using the compiled design of the CNN accelerator. The target is further configured to implement a variation of the CNN accelerator to support execution of a desired CNN algorithm. During runtime, further configurations may be applied to implement other variations of the CNN accelerator to support execution of other CNN algorithms.

Figure 2:
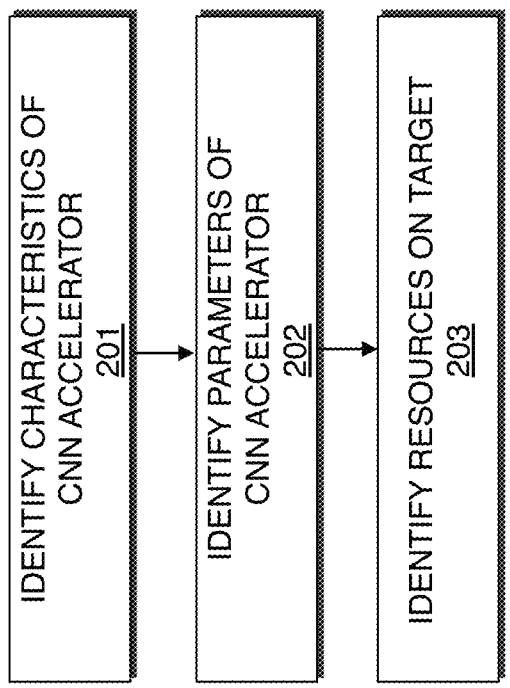
FIG. 2 is a flow chart illustrating a method for identifying features of a CNN accelerator according to an exemplary embodiment of the present disclosure.

FIG. 2 is a flow chart illustrating a method for identifying design features for a CNN accelerator according to an embodiment of the present disclosure. The procedures described in FIG. 2 may be used to implement procedure 101 in FIG. 1 and may be performed by an EDA tool executed on a computer system. At 201, characteristics of the CNN accelerator are identified. According to an embodiment of the present disclosure, identifying the characteristics for the CNN accelerator may include identifying characteristics of one or more CNN algorithms that the CNN accelerator is desired to support. The characteristics of a CNN algorithm may include a number and sequence of stages of layers, such as convolution (standard convolutional) and noise filtering layers. The noise filtering layers may include, for example, pooling, normalization, and rectified linear (ReLU) layers. Each layer in a CNN algorithm may include one or more filters, stride, and other parameters. The characteristics of the CNN algorithm may also include sizes and coefficients of filters, and sizes, strides, and padding of images to be processed. According to an embodiment of the present disclosure, a stride of an image corresponds to a number of pixels that may be skipped in an input when performing convolution and may be used to adjust a number of output results. Padding of an image relates to values added to a perimeter of an image and may be used to match input and output images. It should be appreciated that other characteristics may also be identified.

According to an embodiment of the present disclosure, a plurality of different types of convolution procedures to be performed by the CNN accelerator may be identified. For example, in addition to convolution, deconvolution and backpropagation convolution may also be identified. When deconvolution and backpropagation convolution procedures are identified, the filters used for deconvolution and backpropagation layers are modified to allow the CNN accelerator to utilize hardware used for performing convolution to perform the deconvolution and backpropagation.

Figure 3:
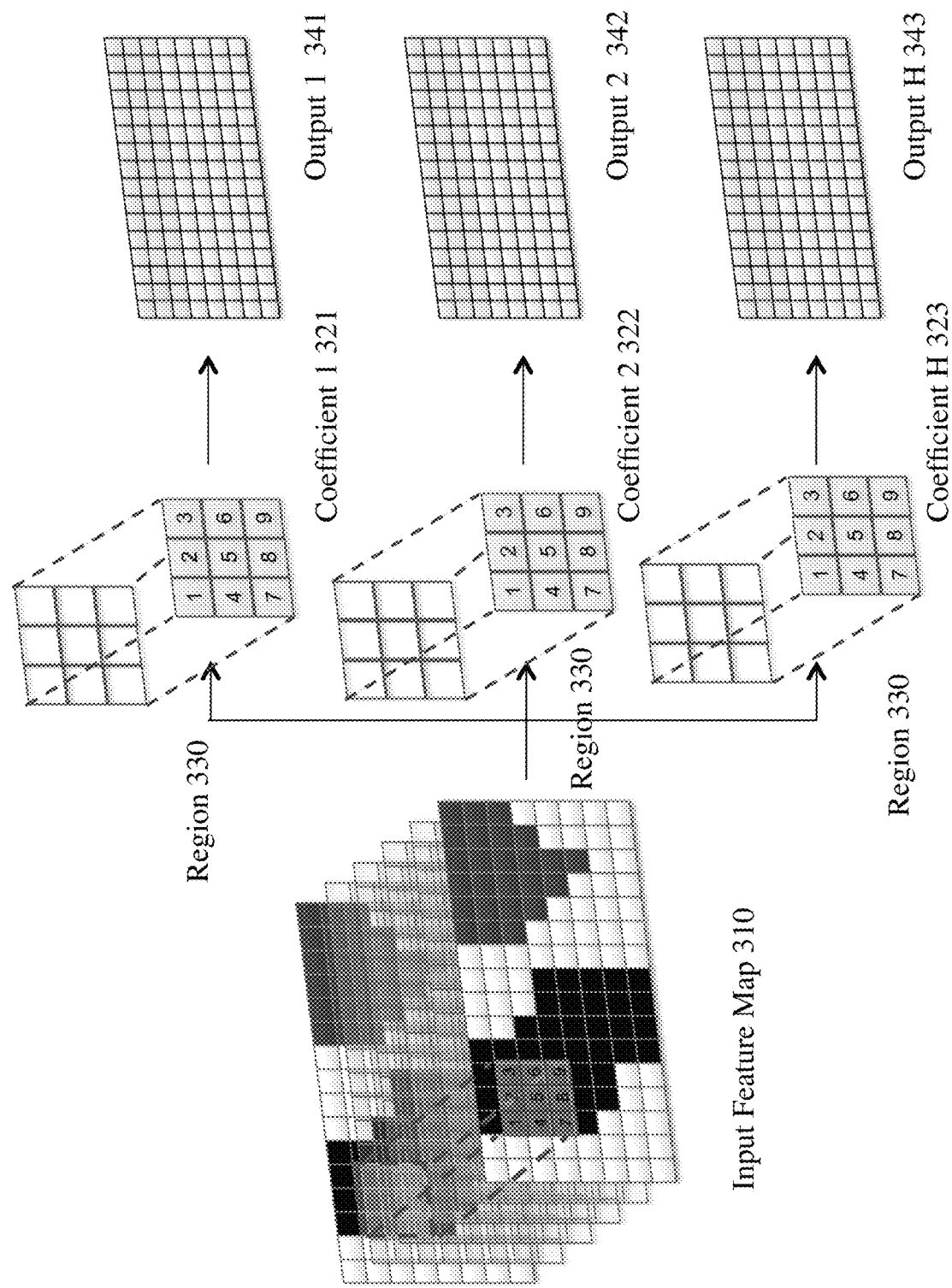
FIG. 3 illustrates an example of a standard convolutional layer implemented by an exemplary embodiment of the present disclosure.

FIG. 3 illustrates an example of a standard convolution layer implemented by an exemplary embodiment of the present disclosure. The standard convolution layer may be one of the layers identified at 201, described with reference to FIG. 2. The standard convolution layer receives input features from an input feature map 310. The standard convolution layer also receives a set of coefficients 321-323 generated through a training of the convolution layer. The coefficients 321-323 apply weights which formulate a filter for the convolution layer. The standard convolution layer performs a 3-dimensional dot product between a region 330 defined within the input features 310 and the coefficients 321-323. The result of each convolution operation is an output at the same (x,y) horizontal and vertical coordinates within the output planes 341-343. Applying the same set of coefficients on different feature regions produces different (x,y) outputs on each output plane 341-343. Therefore, in order to produce the entire (x,y) output planes, the standard convolution layer receives a stream of different input features while applying the same set of coefficients 321-323. According to an embodiment of the present disclosure, a single (x,y) output generated by a single standard convolution over a k×k×D input region 330 may be represented with the following relationship.

$$\text{output} = \sum_{c=0}^{D} \sum_{r=0}^{k} \sum_{s=0}^{k} \text{feature}[c][r][s] * \text{coef}[c][r][s]$$

In the relationship above, D represents an input depth, and k represents a height and width of a region in an input feature map. Different k×k×D coefficient data is used to compute every (x,y) output plane of each convolution layer. Hence, for instance, if a convolution layer has H output planes, a total of H×k×k×D coefficient data is needed for this convolution layer. However, the same H×k×k×D coefficient data is used in the same convolution layer when processing different images.

Figure 4:
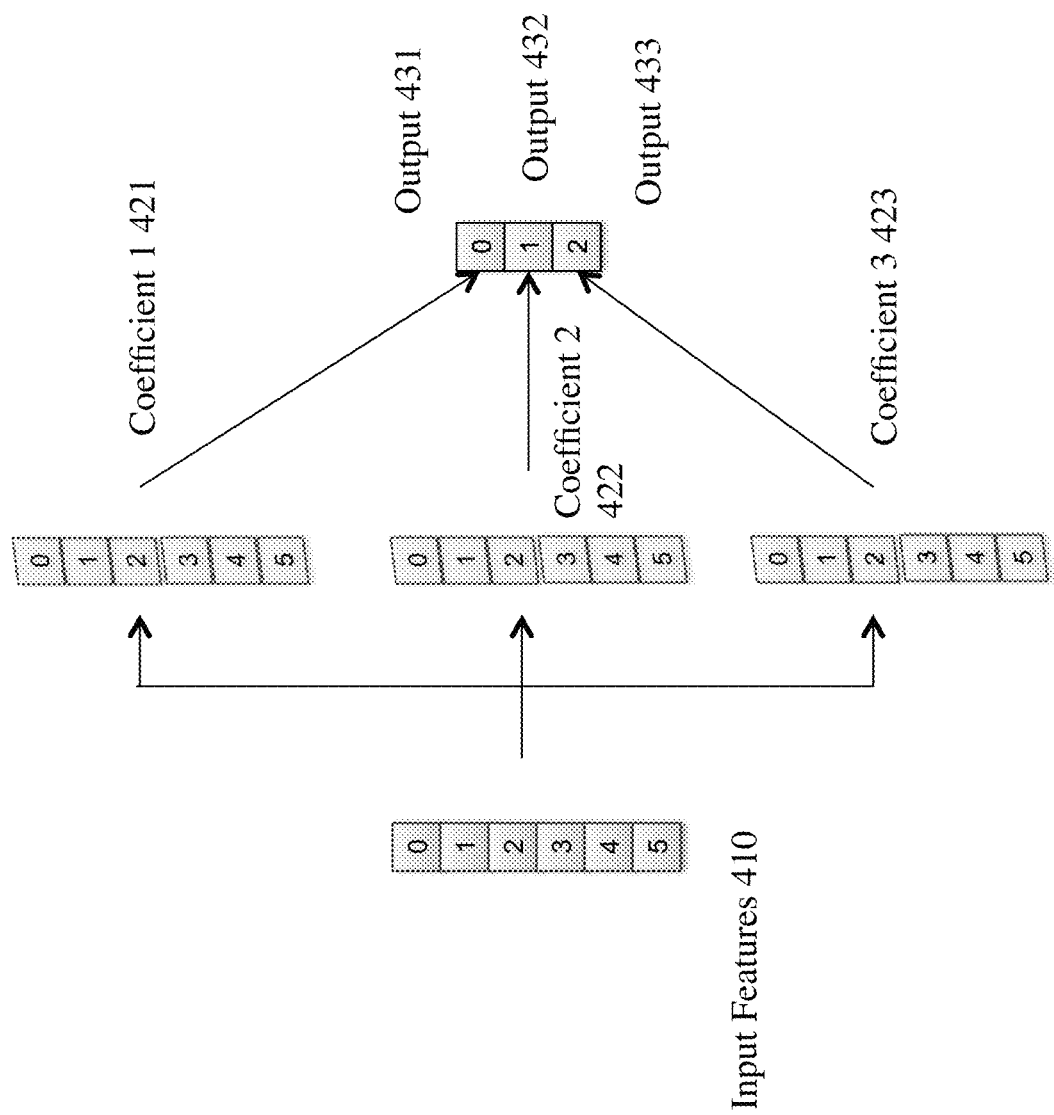
FIG. 4 illustrates an example of a fully-connected layer implemented by an exemplary embodiment of the present disclosure.

FIG. 4 illustrates an example of a fully-connected layer implemented by an exemplary embodiment of the present disclosure. The fully-connected layer receives input features 410 which represent all the feature data from an input feature map. The fully-connected layer also receives a set of coefficients 421-423 generated through a training of the fully-connected layer. The coefficients 421-423 apply weights which formulate a filter for the connected layer. The fully-connected layer takes a 1-dimensional dot product between the input features 410 and the set of coefficients 421-423. The results of the operation are outputs 431-433 which form the output feature map. If the output size is Z, and the input size is N, then the total size of the coefficients is Z×N, i.e. the total size of the coefficient data is larger than the size of the features. Hence, in order to compute the entire output feature map, the fully-connected layer receives a stream of different coefficients while applying a same input features 410 of the same image. According to an embodiment of the present disclosure, a single output z may be represented with the following relationship.

$$\text{output}[z] = \sum_{i=0}^{N} \text{feature}[i] * \text{coef}[z][i]$$

In the relationship above, N represents the size of the input feature map and z represents the index of the output feature that is computed, where the total size of output feature map is Z. Different coefficient data is used to compute the output features of different fully connected layers. However, the same Z×N coefficient data is used in the same fully connected layer when processing different images.

Referring back to FIG. 2, at 202, parameters of the CNN accelerator are identified. According to an embodiment of the present disclosure, identifying parameters for the CNN accelerator may include identifying parameters for the one or more CNN algorithms that the CNN accelerator is desired to support. The parameters of a CNN algorithm may include a number of processing elements to instantiate for each layer identified, and a number of multiplications to execute for each cycle of a kernel. It should be appreciated that other parameters may also be identified.

At 203, resources available on a target to implement the CNN accelerator are identified. According to an embodiment of the present disclosure the target may include one or more target devices of one or more target device types. The resources identified may include a number and type of memory blocks, digital signal processors (DSPs), and other components and processing units on a target device. According to an embodiment of the present disclosure, the features of the CNN may be identified from input provided by the user or from other sources.

Figure 5:
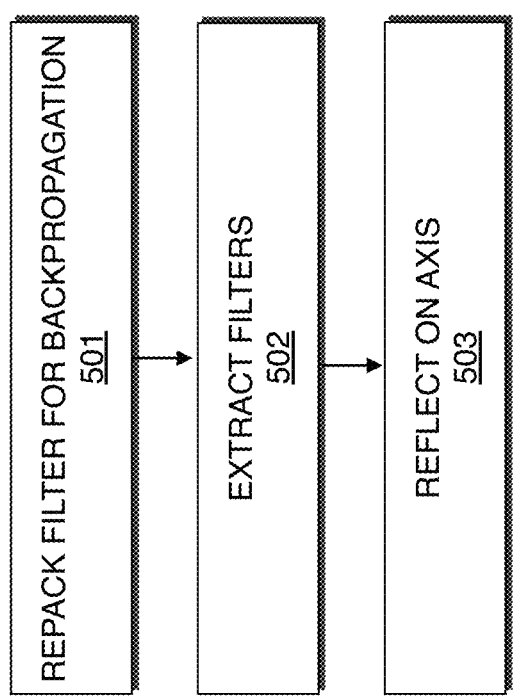
FIG. 5 illustrates a method for modifying deconvolution and convolution backpropagation filters according to an exemplary embodiment of the present disclosure.

FIG. 5 illustrates a method for modifying deconvolution and convolution backpropagation filters according to an exemplary embodiment of the present disclosure. The method illustrated in FIG. 5 may be implemented at procedure 201 in FIG. 2 to allow a CNN accelerator to utilize hardware used for performing convolution to also perform deconvolution and convolution backpropagation. At 501, a convolution backpropagation filter is repacked. According to an embodiment of the present disclosure, repacking a convolution backpropagation filter involves creating an ith convolution backpropagation filter of depth K by taking plane i from every convolution filter. A convolution backpropagation layer that has K filters of depth C is transformed to a convolution backpropagation layer having C filters of depth K. It should be appreciated that procedure 501 is performed only on convolution backpropagation filters.

At 502, a plurality of convolution filters are extracted from a deconvolution filter or the repacked convolution backpropagation filter from 501. According to an embodiment of the present disclosure, the plurality of convolution filters are smaller filters that are extracted based on stride. This may be achieved by dividing an original filter into (stride)×(stride)×(depth size) blocks to create new filters from all sticks that are the same position in each block. According to an embodiment of the present disclosure, sticks refer to a 1×1×depth_size sticks of filter values that are extracted from each (stride)×(stride)×(depth_size) block of an original deconvolution filter and put together to form a plurality of filters for convolution.

Figure 6A:
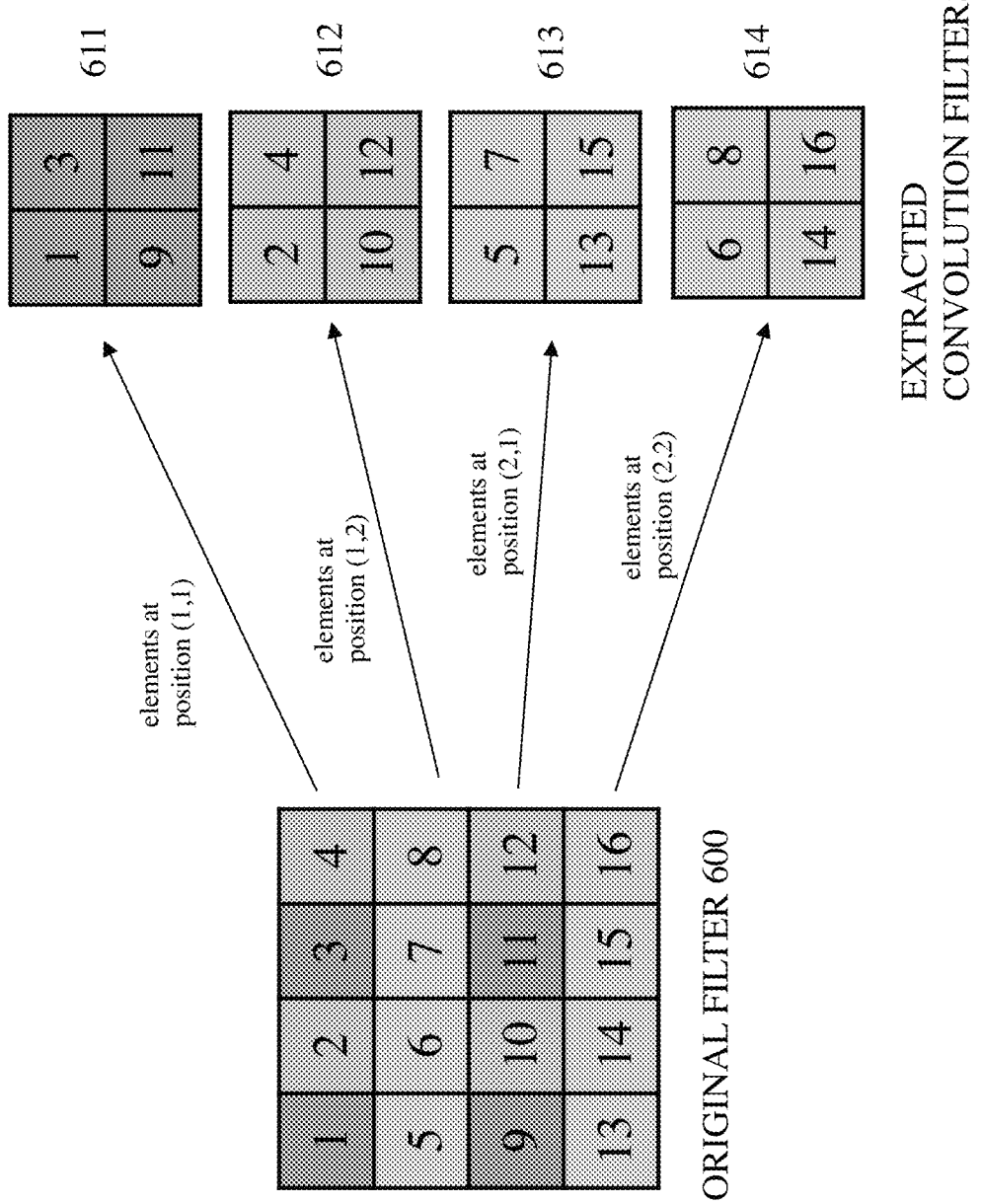
FIG. 6A illustrates an example of extracting a plurality of filters from a deconvolution/convolution backpropagation filter according to an embodiment of the present disclosure.

FIG. 6A illustrates an example of filter extraction of a two-dimensional filter with stride 2. Filter 600 is an original filter which may be a deconvolution filter or the repacked convolution backpropagation filter. As shown, a plurality of 2×2 extracted filters 611-614 are extracted from the original 4×4 filter.

Referring back to FIG. 5, at 503, the values in each of the extracted filters 611-614 are reflected in the x and y axes.

Figure 6B:
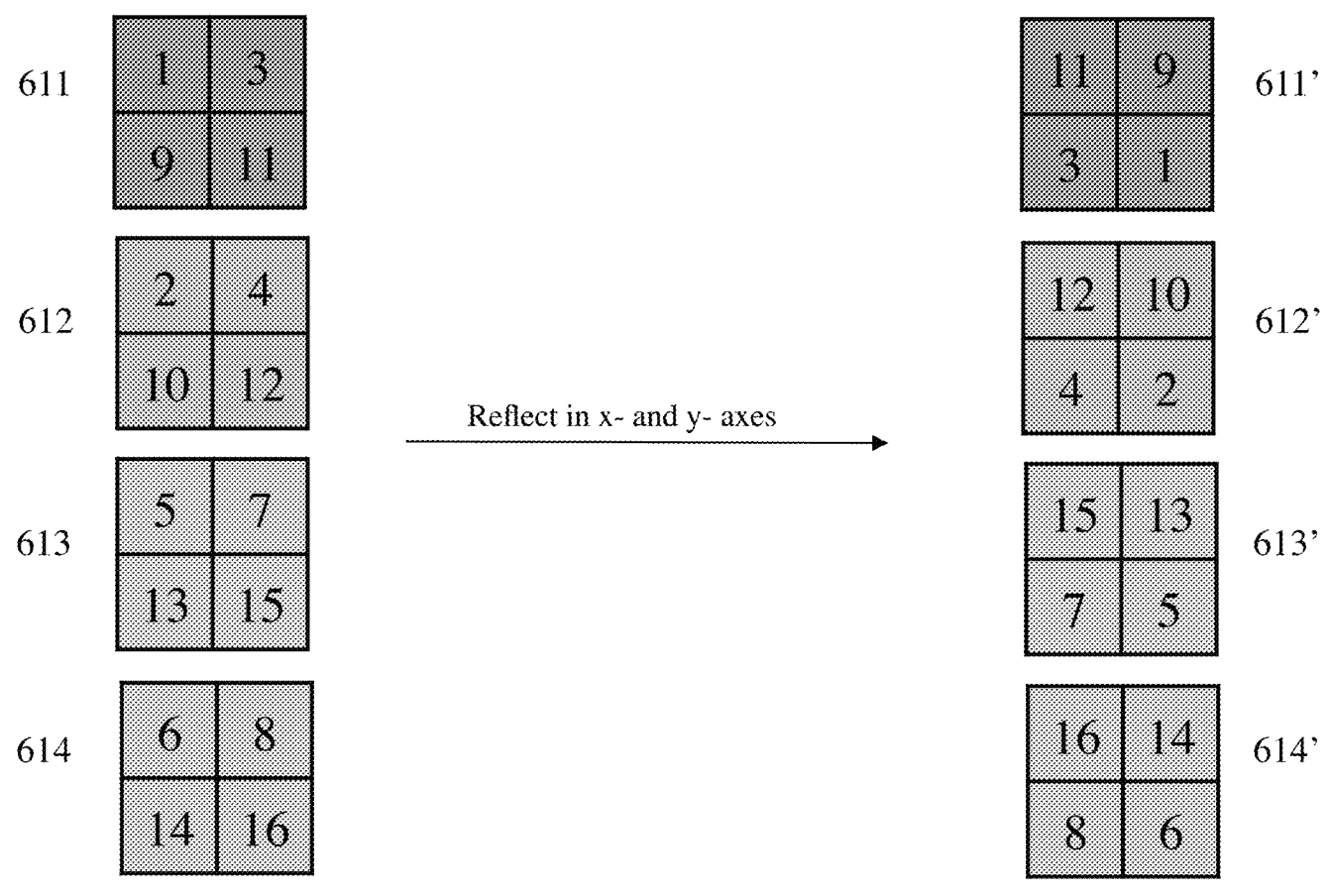

FIG. 6B illustrates an example of reflecting extracted filters 611-614 according to an embodiment of the present disclosure. As shown, the reflection generates a plurality of convolution filters 611'-614'.

Figure 6C:
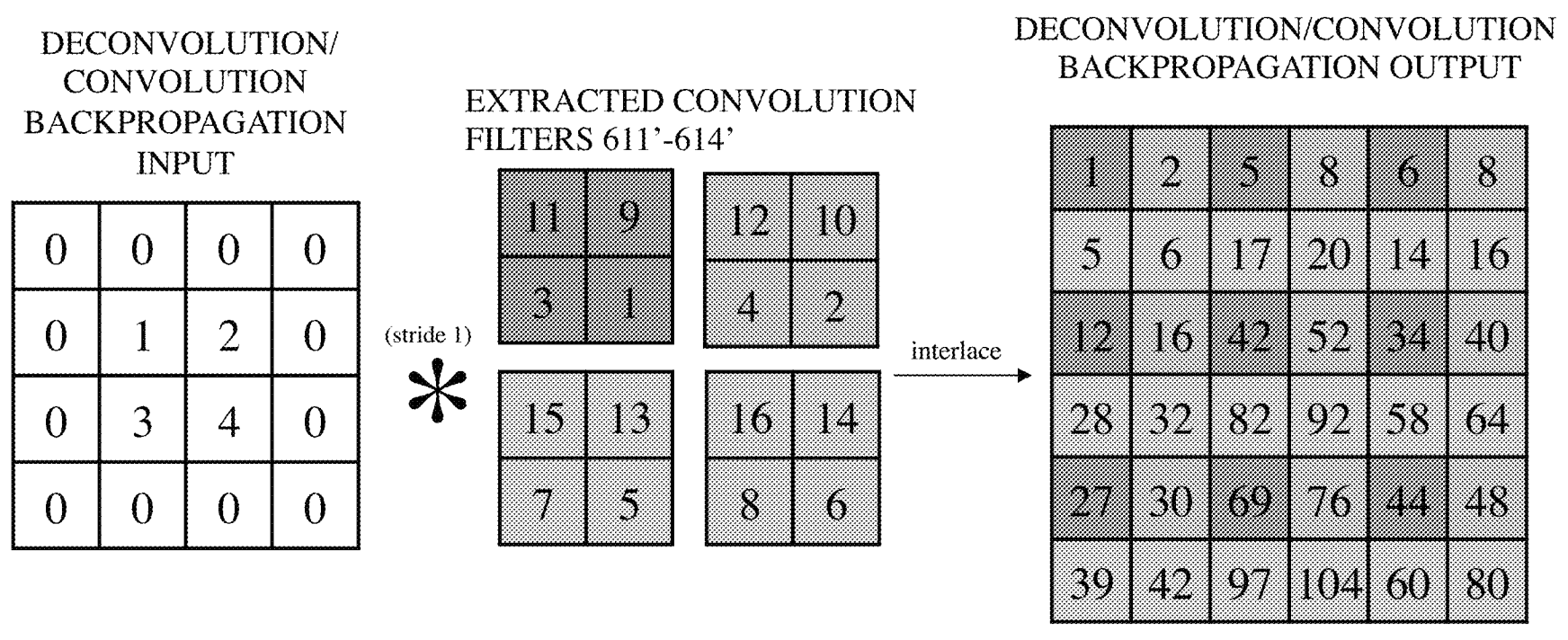

FIG. 6C illustrates how the plurality of convolution filters 611'-614' may be convolved with deconvolution/convolution backpropagation input data that has been padded. The result which may be interlaced to form deconvolution/convolution backpropagation output.

FIG. 7 is a flow chart illustrating a method for generating a design for a CNN accelerator according to an embodiment of the present disclosure. The procedures described in FIG. 7 may be used to implement procedure 102 in FIG. 1 and may be performed by an EDA tool executed on a computer system. At 701, buffers on the CNN accelerator are assigned an appropriate size to support a size of images to be processed by the CNN accelerator. According to an embodiment of the present disclosure, the design for the CNN accelerator architecture is structured such that there is one read port and one write port for each buffer. This ensures an efficient implementation that does not require arbitration to access data in the buffer. According to one embodiment, double buffering is supported to allow writing of new intermediate results from a convolution stage while reading results from a previous stage in a different location in the buffer.

At 702, computation units are generated to support the CNN algorithms to be performed by the CNN accelerator. According to an embodiment of the present disclosure, the computation units include kernels that perform convolution and noise filtering. The computation units may be generated to maximize performance utilizing resources available on a target implementing the CNN accelerator. The resources available on the target that may be utilized may include DSP blocks, memory blocks, shift registers, and adders. In one embodiment, dot product computations performed by kernels are organized to leverage vector modes supported by reconfigurable DSP blocks on the target. In another embodiment, pool layers utilize shift register resources available on the target.

At 703, a sequencer unit is generated. The sequencer unit coordinates transmission of data to appropriate processing elements on the CNN accelerator at appropriate times in order to time multiplex computations on the processing elements, According to an embodiment of the present disclosure, the sequencer unit is programmed to perform the coordination required to support the algorithms performed by the CNN accelerator. The sequencer unit may be generated using logic array blocks, registers, and/or a hard or soft processing unit available on a target device. According to an embodiment of the present disclosure, when deconvolution and backpropagation convolution operations are to be performed by the CNNN accelerator, and characteristics of the deconvolution and backpropagation convolution layers are identified in advance, the sequencer unit may be designed and configured to program the processing elements to implement pre-computed filters using techniques such as those described in FIG. 5. The sequencer unit may also operate to coordinate the padding of the input data and interlacing of results to generate the appropriate output data.

At 704 transformation elements are generated. According to an embodiment of the present disclosure, the transformation elements allow for the utilization of the processing elements to perform deconvolution and convolution backpropagation elements when deconvolution and convolution backpropagation layers are not identified in advance during the design of the CNN accelerator. The transformation elements operate to perform the techniques described in FIG. 5 to repack a convolution backpropagation filter, to extract convolution filters from a repacked convolution backpropagation filter or deconvolution filter, and to reflect values on the extracted filter to generate convolution filters. The transformation elements may also operate to pad input data and interlace results to generate appropriate output data.

At 705, a description of the design is generated. According to an embodiment of the present disclosure, the description of the design may be in a hardware description language (HDL) format or other format.

FIG. 8 is a flow chart illustrating a method for compiling a design for a CNN accelerator on a target according to an exemplary embodiment of the present disclosure. The target may be one or more field programmable gate arrays (FPGAs), application specific integrated circuits (ASICs), structured ASICs, or other programmable device. The procedures described in FIG. 8 are referred to as a compilation flow. The procedures may be used to implement procedure 103 in FIG. 1 and may be performed by an EDA tool executed on a computer system.

At 801, a design for the CNN accelerator is synthesized. Synthesis includes generating a logic design of the system to be implemented by the target. According to an embodiment of the present disclosure, synthesis generates an optimized logical representation of the system from an HDL design definition. The optimized logical representation of the system may include a representation that has a minimized number of functional blocks, such as logic gates, logic elements, and registers, required for the system. Synthesis also includes mapping the optimized logical representation. Mapping includes determining how to implement logic gates and logic elements in the optimized logic representation with the types or categories of resources available on the target. The resources available on the target may be referred to as "cells" or "components" and may include logic-array blocks, registers, memories, DSP blocks, input-output elements, and other components. According to an embodiment of the present disclosure, a netlist is generated from mapping. This netlist may be an optimized technology-mapped netlist generated from the HDL.

At 802, the system is placed. According to an embodiment of the present disclosure, placement involves placing the technology-mapped logical system design on the target. Placement includes fitting the system on the target by determining which specific resources on the target are to be assigned to and implemented by the technology-mapped netlist determined during synthesis. Placement may include clustering which involves grouping logic elements together to form the logic clusters present on the target.

At 803, the placed design is routed. During routing, routing resources on the target are allocated to provide interconnections between logic gates, logic elements, and other components on the target device. Routability optimization may also be performed on the placed logic design. According to an embodiment of the present disclosure, the goal of routability optimization is to reduce the amount of wiring used to connect components in the placed logic design. Routability optimization may include performing fanout splitting, logic duplication, logical rewiring, or other procedures. It should be appreciated that one or more of the procedures may be performed on the placed logic design.

At 804, timing analysis is performed on the design of the system. According to an embodiment of the present disclosure, the timing analysis determines whether timing constraints of the system are satisfied. According to an embodiment of the present disclosure, timing analysis establishes a length for each path in the system as well as the slack for each path in the system. Slack may be defined to be the amount of delay that can be added to a path before it becomes critical or required time for signal arrival minus actual time of signal arrival.

At 805, assembly is performed. The assembly procedure involves creating a configuration file that includes information determined by the procedures described at 801-804. The configuration file may be a bit stream that may be used to program the target to implement the CNN accelerator. Programming the target physically transforms programmable resources on the target into the design of the CNN accelerator.

Figure 9:
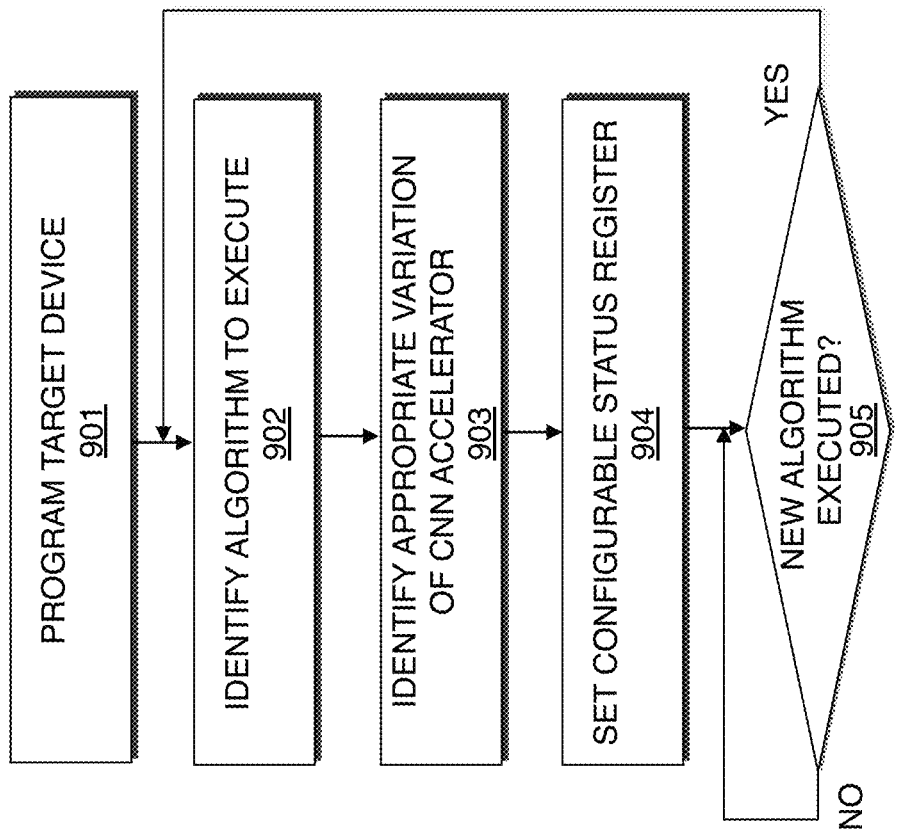
FIG. 9 is a flow chart illustrating a method for configuring a CNN accelerator on a target according to an exemplary embodiment of the present disclosure.

FIG. 9 is a flow chart illustrating a method for configuring a CNN accelerator on a target according to an exemplary embodiment of the present disclosure. The procedures illustrated in FIG. 9 may be used to implement procedure 104 in FIG. 1 and be performed by a CNN accelerator configuration tool on a computer system. At 901, a target is programmed to implement the CNN accelerator. According to an embodiment of the present disclosure, programming the target involves programming one or more target devices with a configuration file that physically transforms the one or more target devices into the design of the CNN accelerator.

At 902, a CNN algorithm to be executed by the CNN accelerator is identified. According to an embodiment of the present disclosure, the CNN algorithm to be executed may be identified from user input or from another source.

At 903, an appropriate variation of the CNN accelerator that supports the CNN algorithm to be executed is identified. According to an embodiment of the present disclosure, the appropriate variation of the CNN accelerator may be identified from user input or from another source.

At 904, one or more configurable status registers are set to support the variation of the CNN accelerator. According to an embodiment of the present disclosure, setting a configurable status register may add or subtract a convolution layer on the CNN accelerator, add or subtract one or more noise filtering layers, or change a size of a filter.

At 905, a determination is made as to whether a new CNN algorithm is to be executed by the CNN accelerator. According to an embodiment of the present disclosure, the determination may be made in response to user input. If a determination is made that a new CNN algorithm is to be executed by the CNN accelerator, control proceeds to 902. If a determination is made that a new CNN algorithm is not to be executed by the CNN accelerator, control returns to 905.

FIGS. 1-2, 5, and 7-9 are flow charts that illustrate embodiments of the present disclosure. The procedures described in these figures may be performed by an EDA tool and a CNN accelerator configuration tool implemented by one or more computer systems. Some of the techniques illustrated may be performed sequentially, in parallel or in an order other than that which is described and that the procedures described may be repeated. It is appreciated that not all of the techniques described are required to be performed, that additional techniques may be added, and that some of the illustrated techniques may be substituted with other techniques.

Figure 10A:
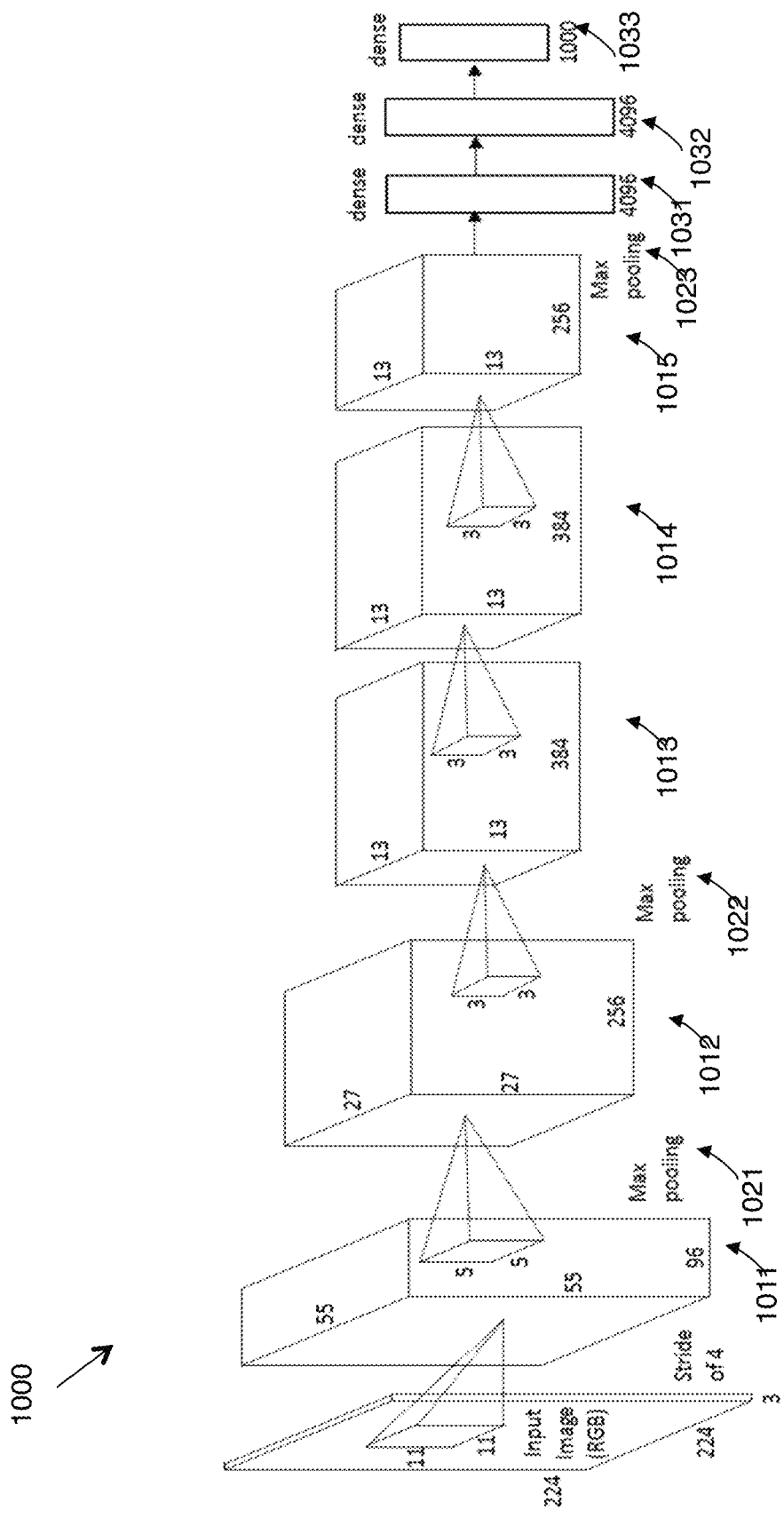
FIG. 10A illustrates an exemplary CNN implementing convolution layers in a convolution network according to an exemplary embodiment of the present disclosure.

FIG. 10A illustrates a conceptual view of an exemplary CNN 1000 implementing convolution layers in a convolution network according to an exemplary embodiment of the present disclosure. The CNN 1000 includes a plurality of layers where each layer transforms one volume of activations to another volume through a differentiable function. The CNN 1000 includes five convolution layers 1011-1015. The convolution layer computes an output of neurons that are connected to local regions in an input. The convolution layer computes a dot product between its coefficients (weights) and the region it is connected to in an input volume. According to an embodiment of the present disclosure, each of the convolution layers 1011-1015 may perform the operations described with reference to the standard convolution layer described in FIG. 3.

The CNN 1000 includes three max-pooling layers 1021-1023. A pooling layer performs a down-sampling operation along spatial dimensions. Pooling layers reduce variance by computing a maximum or average value of a particular feature over a region of an image. This ensures that a same result will be obtained even when image features have small translation. This operation may be used for object classification and detection.

The CNN 1000 includes three fully-connected layers 1031-1033. The fully-connected layers 1031-1033 perform high-level reasoning. The fully-connected layers 1031-1033 take all neurons from a previous layer and connect them to every neuron in its layer. According to an embodiment of the present disclosure, each of the fully-connected layers 1031-1033 may perform the operations described with reference to the fully-connected layer described in FIG. 4.

It should be appreciated that a CNN may include other layers. For example, one or more ReLU layers may be used to apply an element-wise activation function such as max (0,x). The ReLU layer increases non-linear properties of a decision function and of an overall CNN without affecting the receptive fields of a convolution layer.

According to an embodiment of the present disclosure, backpropagation involves taking a difference between a target output and an actual output for an input and propagating that difference back through the CNN with repacked convolution filters. After repacking filters, the remainder of the backpropagation convolution operation is identical to deconvolution.

Figure 10B:
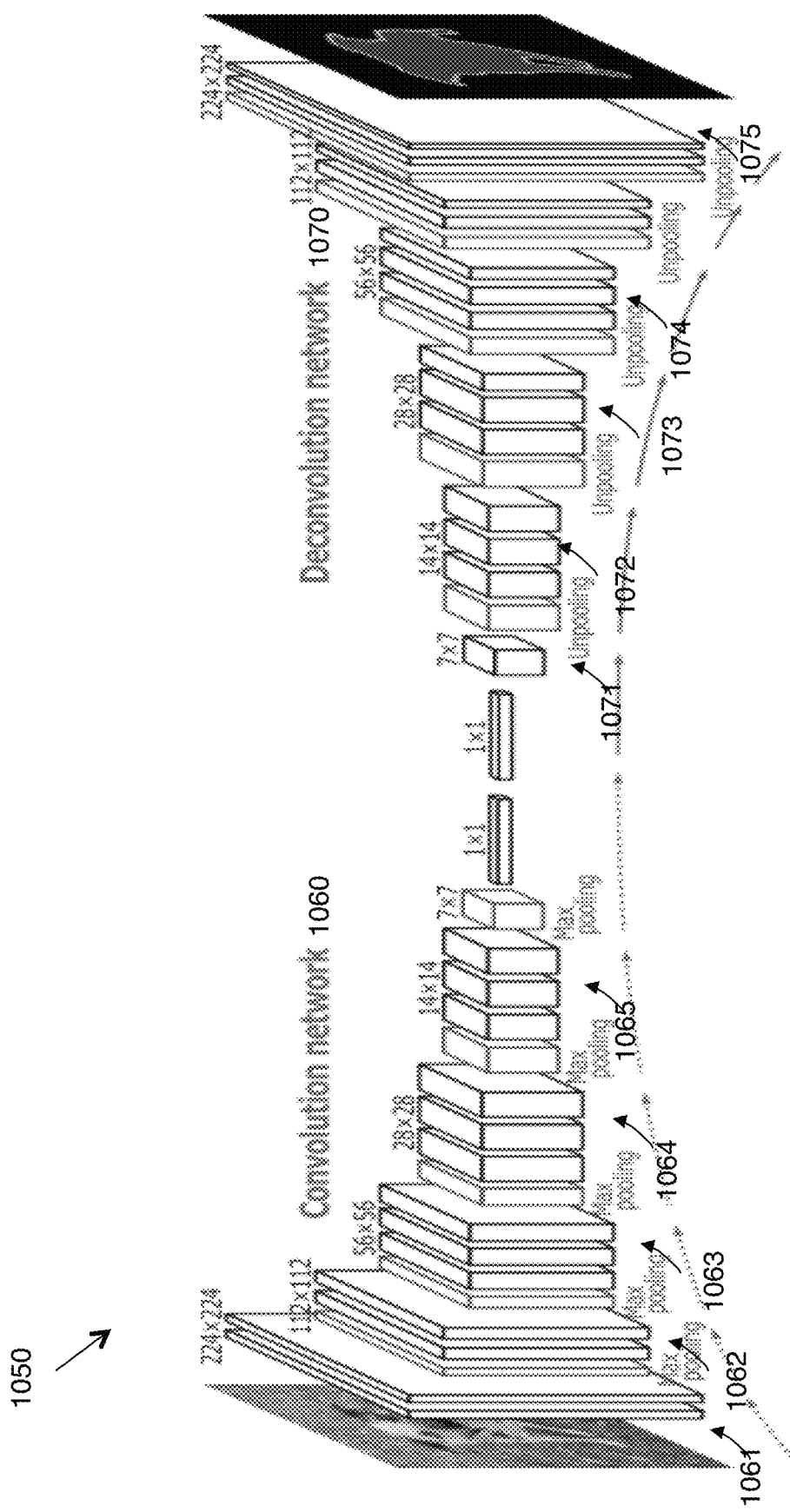
FIG. 10B illustrates an exemplary CNN implementing both convolution and deconvolution layers in a convolution and deconvolution network according to an exemplary embodiment of the present disclosure.

FIG. 10B illustrates an exemplary convolution neural network 1050 implementing both convolution layers 1061-1065 and deconvolution layers 1071-1075 in a convolution network 1060 and deconvolution network 1070 according to an exemplary embodiment of the present disclosure. Deconvolution is an operation performed in fully convolution neural networks used for semantic segmentation. Given an image, semantic segmentation may be used to recognize objects in different areas. The deconvolution layers 1071-1075 illustrated in the deconvolution network 1070 are the opposite of the convolution layers 1061-1065.

Figure 11A:
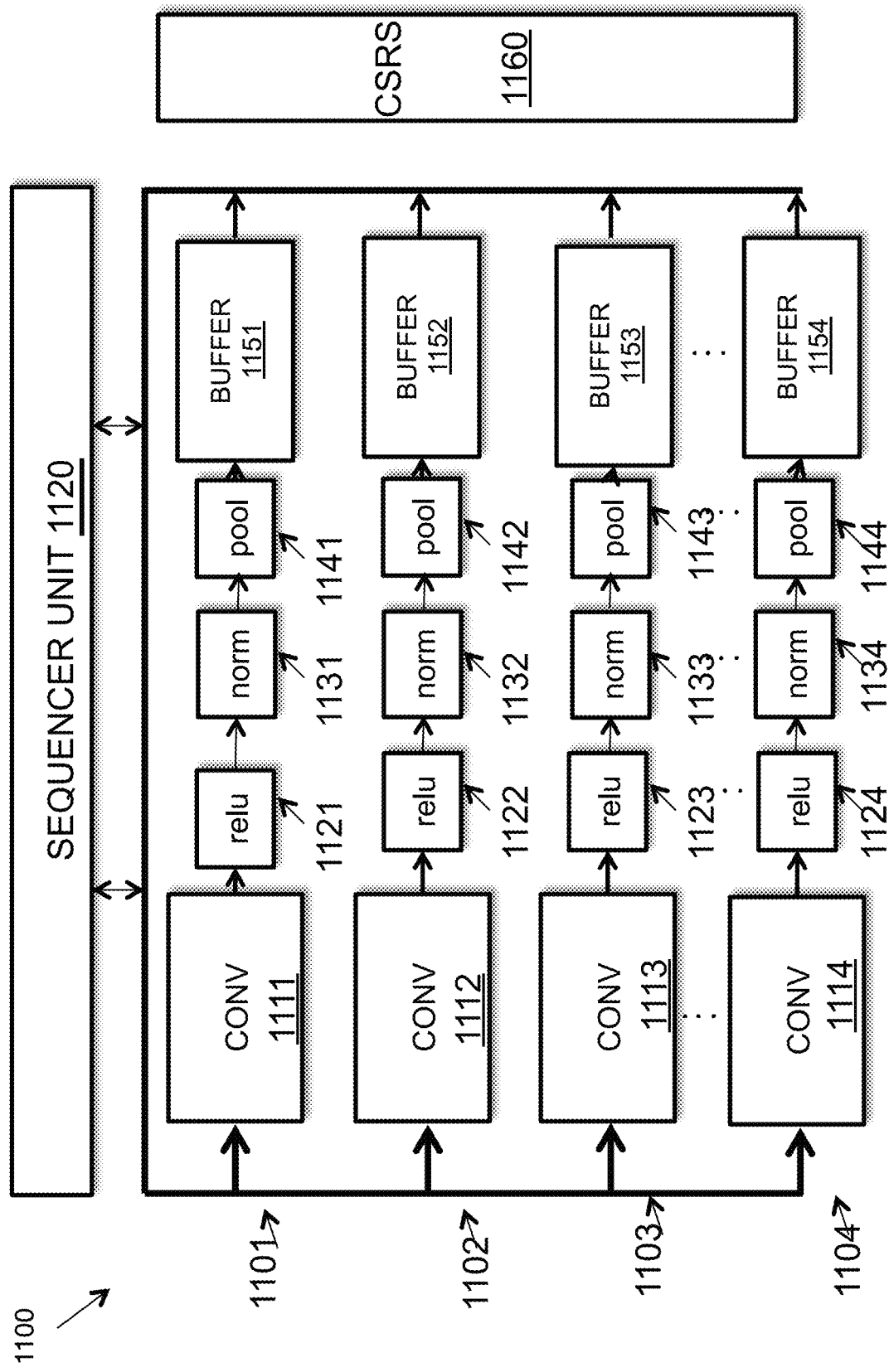
FIG. 11A is a block diagram of a CNN accelerator according to an exemplary embodiment of the present disclosure.

FIG. 11 is a block diagram of an exemplary CNN accelerator 1100 that may be used to implement a CNN according to an embodiment of the present disclosure. The CNN accelerator 1100 allows for efficient computation of forward propagation of convolution and other layers. According to an embodiment of the present disclosure, the CNN accelerator 1100 also allows for efficient computation of deconvolution and convolution back propagation layers. The CNN accelerator 1100 accepts an input image (feature map) and may apply multiple convolution and other layers in succession.

Input image pixels and/or other input are transmitted into the processing element (PE) arrays 1101-1104 which may perform independent dot-product operations in a convolution procedure. PE array 1101 represents a first PE array and PE array 1104 represents an nth PE array, where n can be scaled to any number. According to an embodiment of the present disclosure, each PE array includes hardware components that support layers such as a convolution layer, ReLU layer, normalization layer, and pooling layer.

A sequencer unit 1120 orchestrates the sequencing, addressing, and delivery of data to each of the PE arrays 1101-1104, kernels in each of the PE arrays 1101-1104, and components in each of the kernels. The sequencer unit 1120 coordinates the transmission of data to appropriate PE arrays 1101-1104 in order to time multiplex computations on the PE arrays 1101-1104. The accumulated results from the PE arrays 1101-1104 may be transmitted to one of the buffers 1151-1154 which transmits the computed output layer back to kernels and components in the PE arrays 1101-1104 for a next round of layer computation. The buffers 1151-1154 reside on a target device implementing the CNN accelerator 1100 and may be referred to as on-chip buffers.

The CNN accelerator 1100 includes configurable status registers (CSRs) 1160. The CSRs 1160 are programmable by a user during runtime to modify various aspects of the CNN accelerator 1100. For example, the CSRs 1160 may be set to add or subtract a number of convolution layers used by the CNN accelerator 1100, add or subtract one or more pooling, ReLU, or other layers used by the CNN accelerator 1100, and/or change a size or other property of a filter supported by the CNN accelerator 1100. The CSRs 1160 may be coupled to each of the components of the PE arrays 1101-1104.

According to an embodiment of the present disclosure, each of the PE arrays 1101-1104 includes a first kernel 1111-1114, that supports a convolution layer, a second kernel 1121-1124, that supports a ReLU layer, a third kernel 1131-1134, that supports a normalization layer, and a fourth kernel 1141-1144, that supports a pooling layer. The output of the fourth kernel, 1141-1144, is transmitted to a buffer 1151-1154 from where it may be fed back into the first kernel 1111-1114 for the next convolution stage. According to an embodiment of the present disclosure, a single kernel may support the normalization layer, in this embodiment, the single normalization kernel would be connected to kernels 1121-1124 that support the ReLU layer. It should be appreciated that each of the PE arrays 1101-1104 may include kernels that implement layers other than the ones illustrated in FIG. 11, such as fully-connected layers. According to an embodiment of the present disclosure, the first kernels 1111-1114 may be used to implement both convolution layers and fully-connected layers.

Although buffers 1151-1154 are shown to be connected to the fourth kernels 1141-1144 in the PE, arrays 1101-1104, it should be appreciated that buffers 1151-1154 may be directly connected to any of the kernels in the PE arrays 1101-1104. According to an embodiment of the present disclosure, the first kernels 1111-1114 in the PE arrays 1101-1104 are directly connected to the buffers 1151-1154 and may store data in the buffers 1151-1154 without routing the data through any other kernel.

Figure 11B:
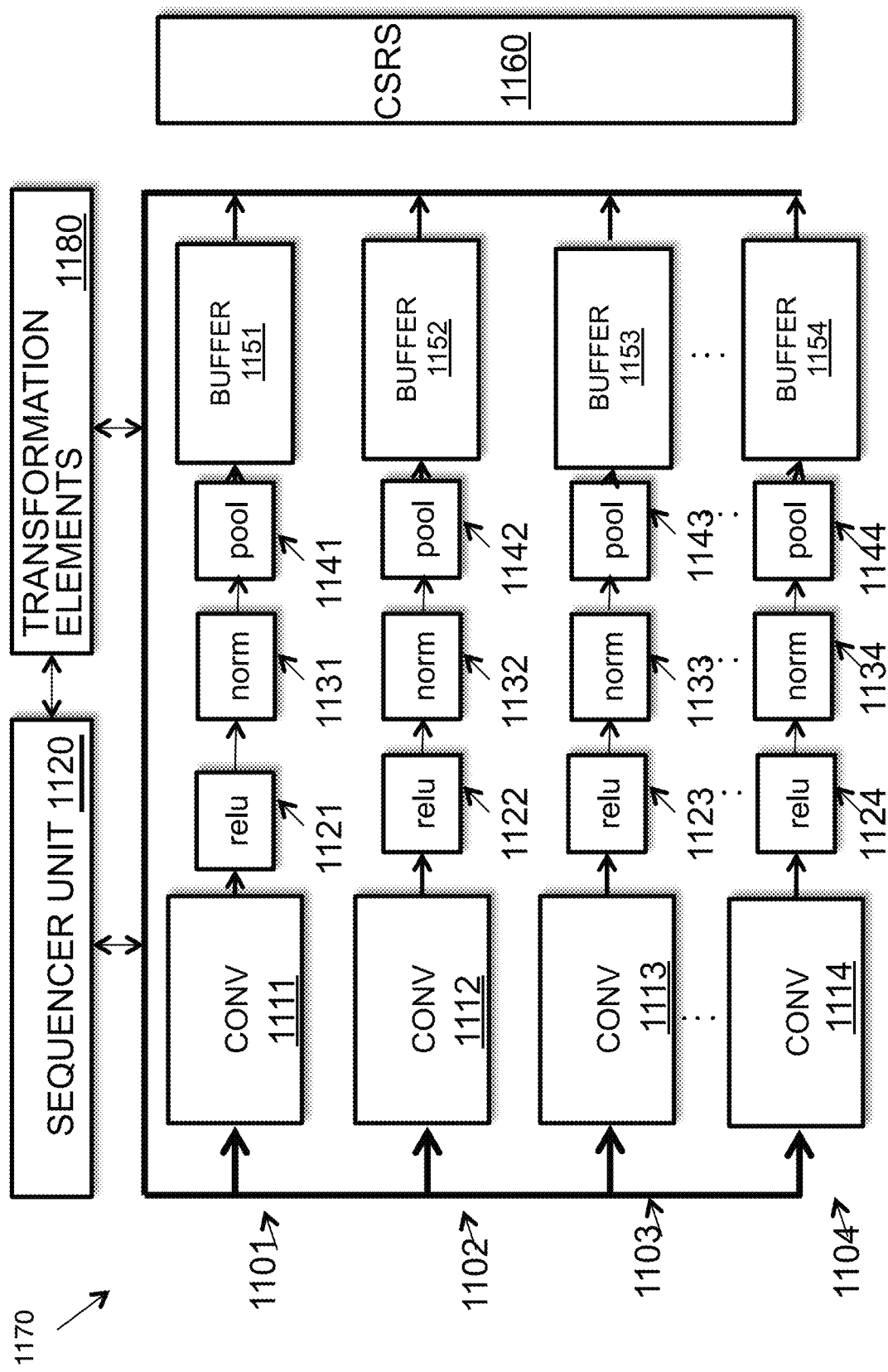
FIG. 11B is a block diagram of a CNN accelerator utilizing transformation elements according to an exemplary embodiment of the present disclosure.

FIG. 11B is a block diagram of an exemplary CNN accelerator 1180 that may be used to implement a CNN according to an alternate embodiment of the present disclosure. The CNN accelerator 1180 includes several components that are found in CNN accelerator 1170 which perform similar functionalities. The CNN accelerator 1180 includes transformation elements 1170 which allow the CNN accelerator 1180 to utilize PE arrays 1101-1104 to support deconvolution and convolution backpropagation operations.

According to an embodiment of the present disclosure, the transformation elements 1180 may receive raw filter data that may describe a deconvolution filter or a convolution backpropagation filter. The transformation elements 1180 may transform the raw filter data to transformed filter data that describes one or more convolution filters that may be used in place of the deconvolution filter or convolution backpropagation filter to perform deconvolution or convolution backpropagation. The transformed filter data may be transmitted to the PE arrays 1101-1104 to program the PE arrays 1101-1104 to implement the one or more convolution filters.

According to an embodiment of the present disclosure, the transformation elements 1180 may receive raw processing element output data from the PE arrays 1101-1104. When the raw processing element output data are generated from performing convolution on input data for a deconvolution or convolution backpropagation operation, the transformation elements 1180 may transform the raw processing element output data to transformed output data by performing interlacing. It should be appreciated that the transformation elements may also prepare raw input data corresponding to a deconvolution or convolution backpropagation operation by padding the raw input data in a specified manner.

Figure 12:
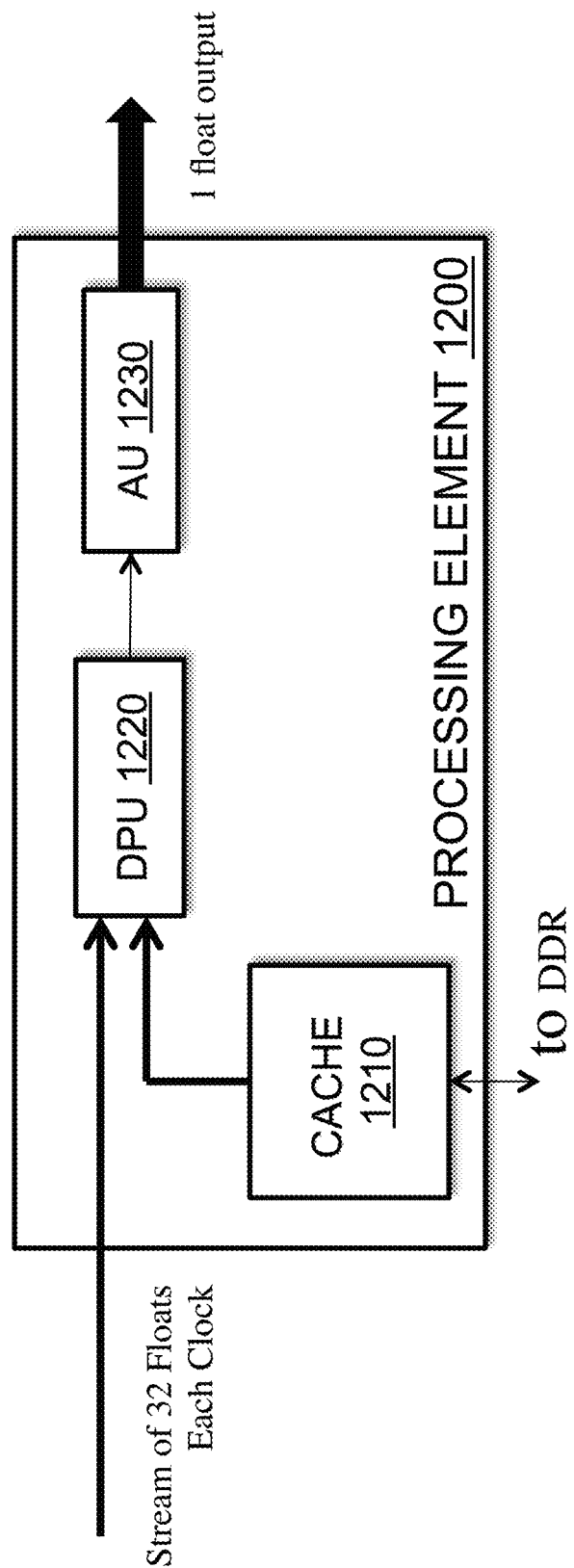
FIG. 12 is a block diagram illustrating a processing element according to an exemplary embodiment of the present disclosure.

FIG. 12 is a block diagram illustrating an exemplary processing element 1200 according to an exemplary embodiment of the present disclosure. The processing element 1200 may be used to implement any one of the first kernels 1111-1114 illustrated in FIGS. 11A and 11B that supports a convolution layer. It should be appreciated that the processing element 1200 may also be used to support a fully-connected layer. According to an embodiment of the present disclosure, the processing element 1200 includes a cache 1210 for storing recycled, repeated data. The cache 1210 may be implemented using a memory block on a target device. The processing element 1200 includes a dot product unit 1220 that computes N-float dot products every clock cycle. According to an embodiment of the present disclosure, N is configured at 202. The dot product unit 1220 receives streaming, non-repeated data and recycled, repeated data. The dot product unit 1220 may be implemented using one or more DSP blocks on the target. The processing element 1200 includes an accumulator unit 1230. The accumulator unit 1230 accumulates dot product results as partial sums until an entire computation is completed. The accumulator unit 1230 may be implemented using a logic array block.

One or more processing elements may be used together with off-chip memory interfaces, on-chip buffers, and control logic to route data into and out of the one or more processing elements to support computations performed by a variety of algorithms. These computations include matrix multiplication, and 1D/2D/3D convolutions. One or more processing elements may also be used to implement both a standard convolution layer and a fully-connected layer at different instances of time. The number of processing elements and their configurations may be adjusted to match the performance and resource requirements of the CNN algorithm.

A first input to the processing element 1200 may be used to stream in non-repeated data. A second input to the processing element 1200 is used to stream in repeated data that is used more than once. The non-repeated data may be stored in an on-chip buffer and streamed in directly into the dot product unit 1220. Repeated data may be read from an external memory and stored in the cache 1210. The cache 1210 may be utilized to take advantage of temporal locality of the repeated data.

When implementing a standard convolution layer using one or more of the processing elements, feature map data is treated as non-repeated data and stored in on-chip buffers 1151-1154. The output of one convolution layer is streamed into a next convolution layer. Each processing element receives the same streaming feature data that belongs to the same image every cycle to compute an output in the same (x,y) output coordinates in different output planes. Coefficient data is treated as repeated data since the same set of coefficients is used to compute different output feature maps in the same (x,y) output plane. The coefficient data is read into the cache 1210 of the processing element 1200. Different caches store different coefficient data needed to process different output planes. The coefficient data may be read into the cache 1210 from an external memory, but is not written back. Utilizing the cache 1210 reduces required accesses to the external memory.

When implementing a fully-connected layer using one or more of the processing elements, coefficient data is treated as non-repeated data and is stored in on-chip buffers 1151-1154. The coefficient data is treated as non-repeated data since different sets of coefficient data are used to compute different output features of each image. Sets of coefficient data are read once from external memory, stored on on-chip buffers, and streamed into processing elements. Alternatively, coefficient data may also be streamed directly from DDR without being stored on on-chip buffers. Fully connected layers are computed using a batch mode; a number of images are processed simultaneously in that each processing element applies the same fully connected layer for a different image. Since the same coefficient data is used for different images, each processing element receives the same coefficient data every cycle to apply to different feature data that belong to different images and to compute different output features of different images. Feature data is treated as repeated data. The input features are read from external memory into the cache 1210. The caches in different processing elements store features data for different images. Input feature data is treated as repeated data since the same input feature data is used to compute different output features of the same image. The final output feature maps computed are stored in external memory.

Figure 13:
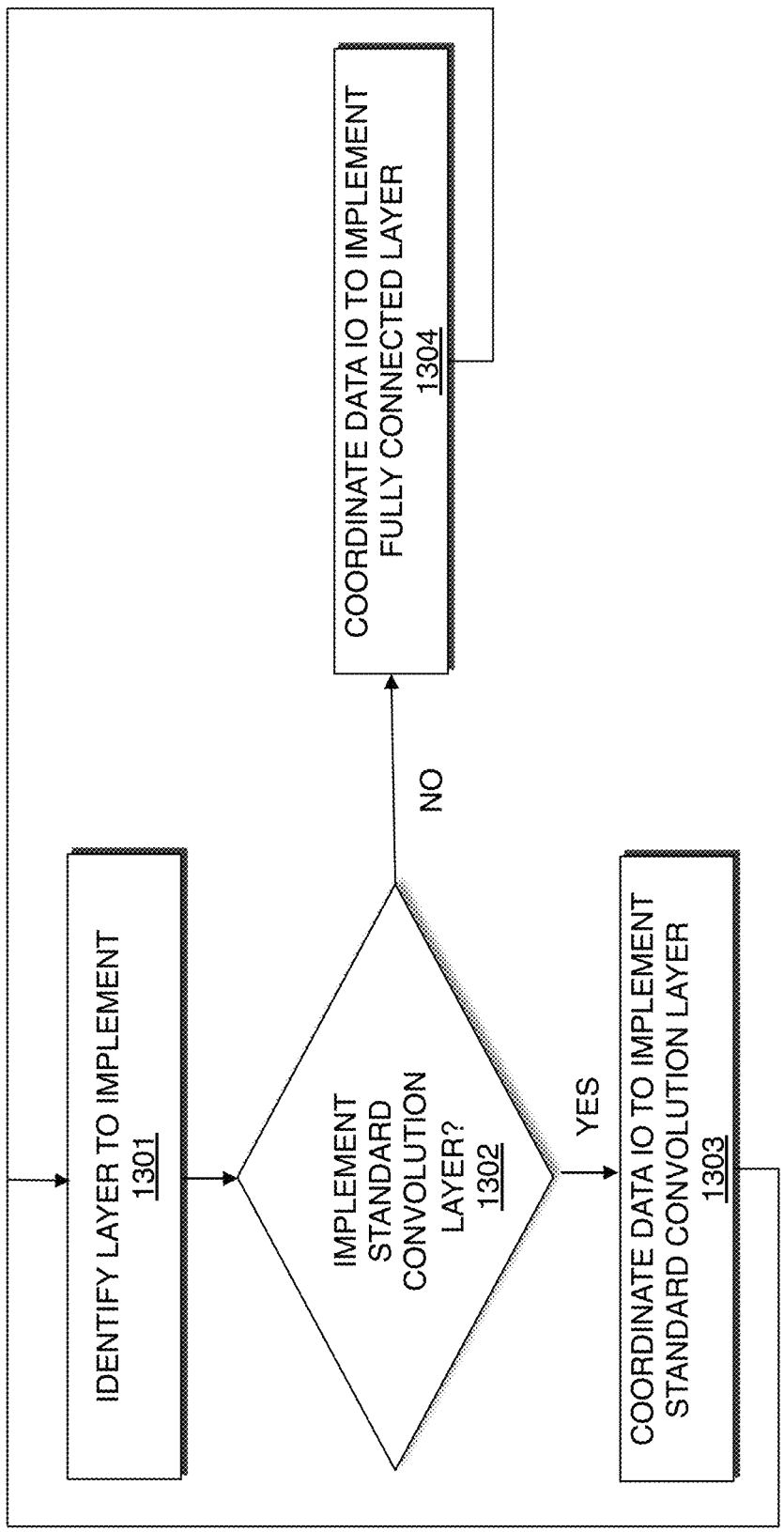
FIG. 13 is a flow chart illustrating a method for utilizing one or more processing elements to implement a standard convolutional layer and a fully connected layer according to an exemplary embodiment of the present disclosure.

FIG. 13 is a flow chart illustrating a method for utilizing one or more processing elements to implement a standard convolutional layer and a fully connected layer according to an exemplary embodiment of the present disclosure. The method illustrated in FIG. 13 may be performed by a sequencer unit such as the sequencer unit 1120 illustrated in FIG. 11. At 1301, a layer to implement on a CNN accelerator is identified. According to an embodiment of the present disclosure, the layer to implement may be identified from characteristics of the CNN accelerator and tracking a stage in which data is being processed by the CNN accelerator.

At 1302, it is determined whether the layer to implement is a standard convolution layer. If the layer to be implemented is a standard convolution layer, control proceeds to 1303. If the layer to be implemented is not a standard convolution layer, control proceeds to 1304.

At 1303, data flow is coordinated to implement a standard convolution layer. The data flow that is coordinated includes data input and output to and from one or more processing elements and components residing on and off the CNN accelerator.

At 1304, data flow is coordinated to implement a fully connected layer. The data flow that is coordinated includes data input and output to and from one or more processing elements and components residing on and off the CNN accelerator. It should be appreciated that the procedures illustrated in FIG. 13 may be repeated such that control returns to procedure 1301 after procedures 1303 or 1304 are completed.

Figure 14:
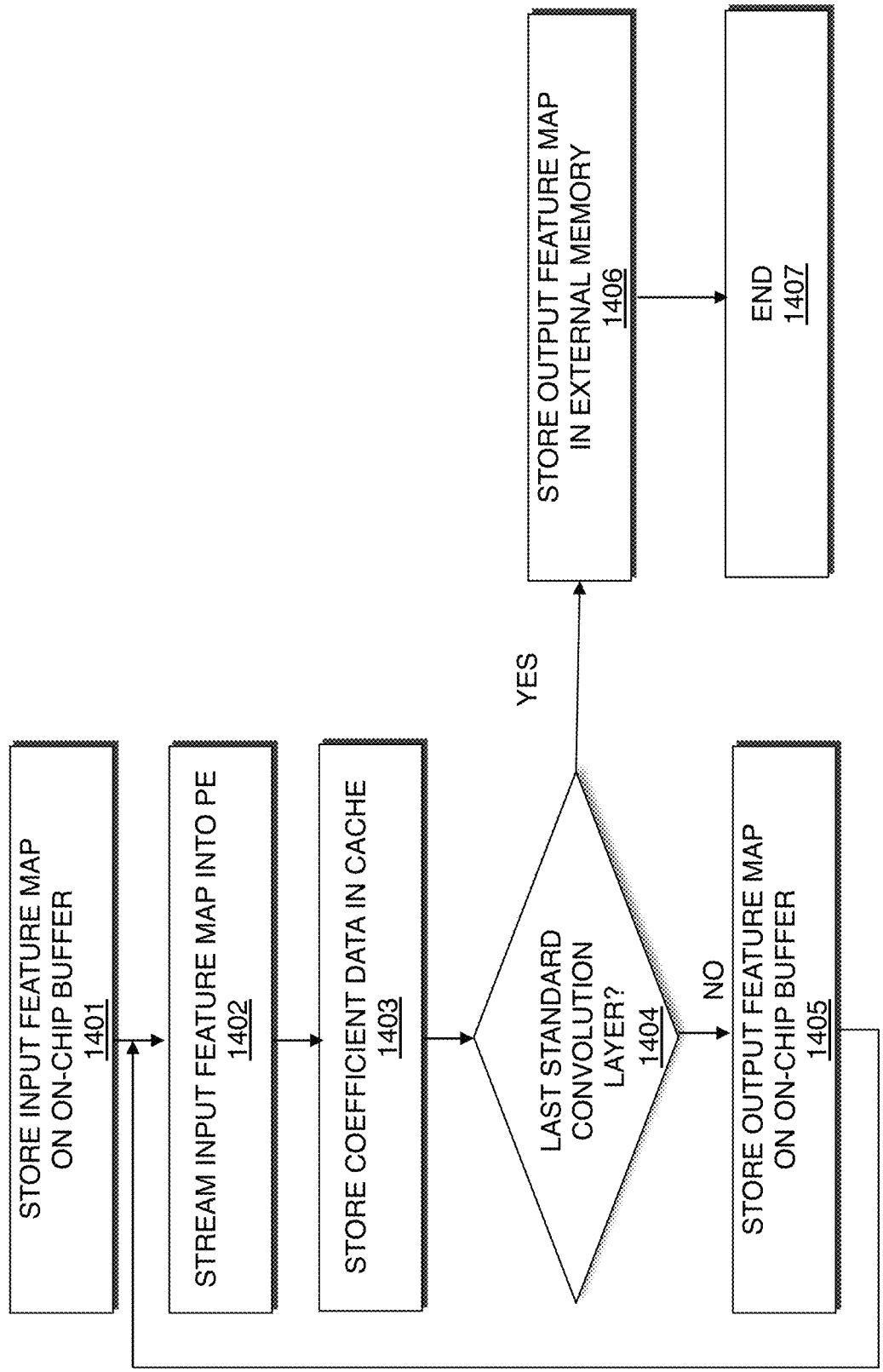
FIG. 14 is a flow chart illustrating a method for managing data input and output on a CNN accelerator to utilize one or more processing elements to implement a standard convolutional layer according to an exemplary embodiment of the present disclosure.

FIG. 14 is a flow chart illustrating a method for managing data input and output on a CNN accelerator to utilize one or more processing elements to implement a standardconvolutional layer according to an exemplary embodiment of the present disclosure. The method described in FIG. 14 may be used to implement procedure 1303 illustrated in FIG. 13. At 1401, an input feature map is stored on an on-chip buffer.

At 1402, data from the input feature map is streamed into a processing element from the on-chip buffer.

At 1403, coefficient data is stored in a cache of the processing element. The input feature map streamed into the processing element and the coefficient data stored in the cache of the processing element may be processed by the processing element in the manner described with reference to FIG. 3 to generate an output feature map.

At 1404, it is determined whether a present standard convolution layer is a last standard layer to be implemented for processing the feature map. If the present standard convolution layer is not the last standard convolution layer to be implemented, control proceeds to 1405. If the present standard convolution layer is the last standard layer to be implemented, control proceeds to 1406.

At 1405, the generated output feature map is stored on the on-chip buffer. Control returns to 1402.

At 1406, the generated output feature map is stored in an external memory. The external memory may reside off the target implementing the CNN accelerator. Control proceeds to 1407 where the procedure is terminated.

Figure 15:
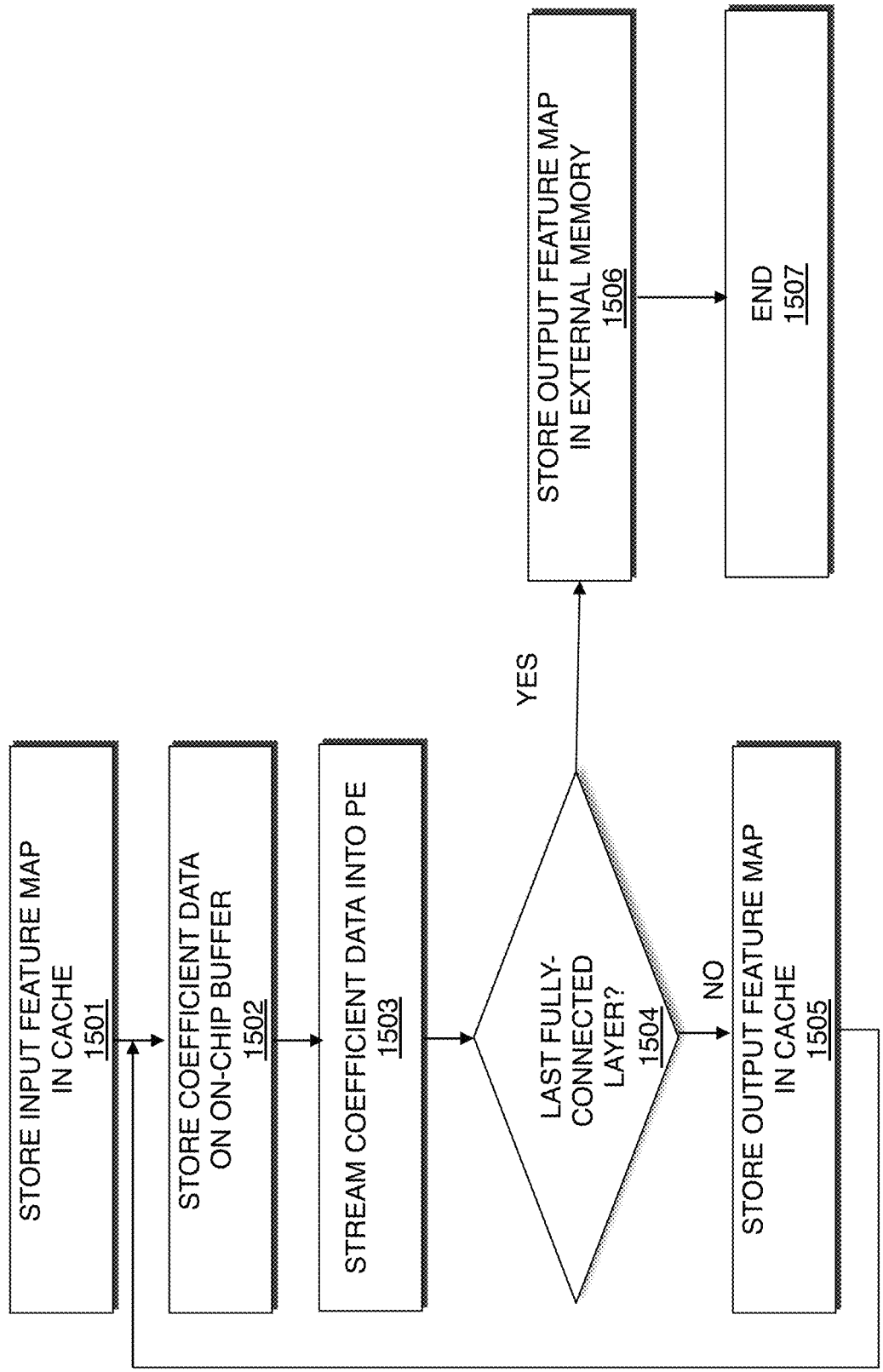
FIG. 15 is a flow chart illustrating a method for managing data input and output on a CNN accelerator to utilize one or more processing elements to implement a fully connected layer according to an exemplary embodiment of the present disclosure.

FIG. 15 is a flow chart illustrating a method for managing data input and output on a CNN accelerator to utilize one or more processing elements to implement a fully connected layer according to an exemplary embodiment of the present disclosure. The method described in FIG. 15 may be used to implement procedure 1304 illustrated in FIG. 13. At 1501, an input feature map is stored in a cache of a processing element.

At 1502, coefficient data is stored on an on-chip buffer.

At 1503, the coefficient data is streamed into the processing element from the on-chip buffer. The input feature map stored in the cache of the processing element and the coefficient data streamed from the on-chip buffer may be processed by the processing element in the manner described with reference to FIG. 4 to generate an output feature map.

At 1504, it is determined whether a present fully-connected layer is a last fully-connected layer to be implemented for processing the feature map. If the present fully-connected layer is not the last fully-connected layer to be implemented, control proceeds to 1505. If the present fully-connected layer is the last fully-connected layer to be implemented, control proceeds to 1506.

At 1505, the generated output feature map is stored in the cache. Control returns to 1502.

At 1506, the generated output feature map is stored in an external memory. The external memory may reside off the target implementing the CNN accelerator. Control proceeds to 1507 where the procedure is terminated.

FIGS. 13-15 are flow charts that illustrate embodiments of the present disclosure. The procedures described in these figures may be performed by a sequencer unit implemented by a CNN accelerator, and may be used to program the sequencer unit as described with reference to 703 in FIG. 7. Some of the techniques illustrated may be performed sequentially, in parallel or in an order other than that which is described and that the procedures described may be repeated. It is appreciated that not all of the techniques described are required to be performed, that additional techniques may be added, and that some of the illustrated techniques may be substituted with other techniques.

Figure 16:
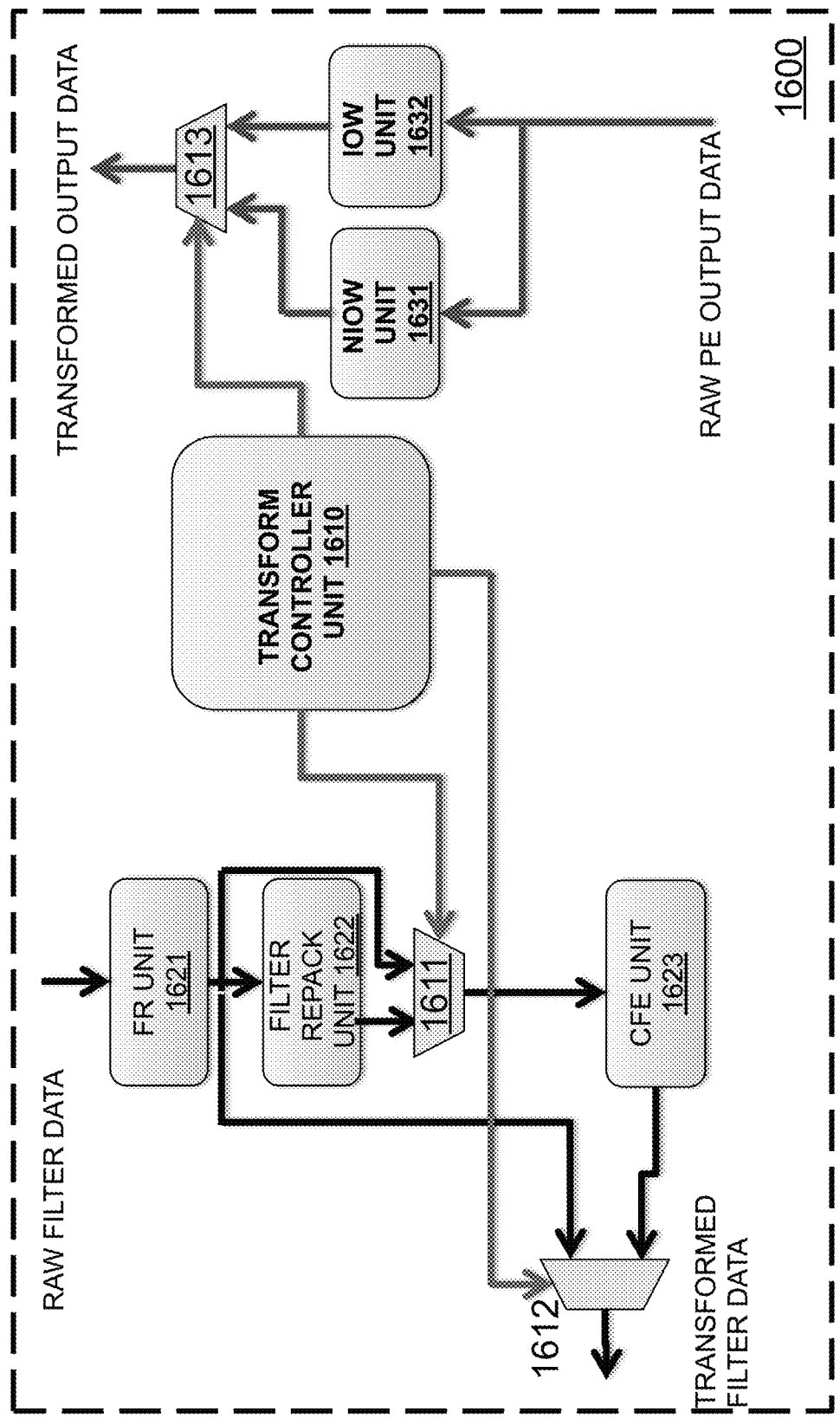
FIG. 16 is a block diagram illustrating transformation elements according to an exemplary embodiment of the present disclosure.

FIG. 16 is a block diagram illustrating transformation elements 1600 according to an exemplary embodiment of the present disclosure. The transformation elements 1600 may be used to implement the transformation elements 1180 illustrated in FIG. 11B. The transformation elements 1600 includes a transform controller unit 1610 that operates to control selectors 1611-1613 according to a type of convolution operation that is to be performed.

The transformation elements 1600 includes a filter reader (FR) unit 1621. The filter reader unit 1621 receives raw filter data that describes a filter to be used in a convolution operation. The raw filter data may describe a convolution filter, a deconvolution filter, or a convolution propagation filter.

The transformation elements 1600 includes a filter repack unit 1622. The filter repack unit 1622 receives the raw filter data and performs a repacking procedure. According to an embodiment of the present disclosure, repacking involves creating an ith backpropagation filter of depth K by taking plane i from every convolution filter. The variable C may be defined as a depth of input to a convolution layer. The variable K may be defined as a depth of output of a convolution layer. According to an embodiment of the present disclosure, this procedure creates C backpropagation filters.

Selector 1611 receives a repacked filter that is output from the filter repack unit 1622 and the original filter from the filter reader unit 1621. Selector 1611 selects the repacked filter in response to a select signal from the transform controller unit 1620 if the transform controller unit 1610 determines that a convolution backpropagation operation is to be performed and that the raw filter data received by filter reader unit 1621 corresponds to a convolution backpropagation filter. Selector 1611 selects the original filter in response to a select signal from the transform controller unit 1620 if the transform controller unit 1610 determines that a deconvolution operation is to be performed and that the raw filter data received by filter reader unit 1621 corresponds to a deconvolution filter. If the transform controller unit 1610 determines that a convolution operation is to be performed and that the raw filter data received by filter reader unit 1621 corresponds to a convolution filter, either filter may be selected by selector 1611.

The transformation elements 1600 includes a convolution filter extraction (CFE) unit 1623. The convolution filter extraction unit 1623 extracts a plurality of convolution filters from the filter output from selector 1611. The convolution filter extraction unit 1623 extracts smaller convolution filters based on stride.

Selector 1612 receives the extracted convolution filters from the convolution filter extraction unit 1623 and the original filter from the filter reader unit 1621. The selector 1612 selects the extracted convolution filters to be output in response to a select signal from the transform controller unit 1610 if the transform controller unit 1610 determines that a deconvolution or convolution backpropagation operation is to be performed. The selector 1612 selects the original filter to be output in response to a select signal from the transform controller unit 1610 if the transform controller unit 1610 determines that a convolution operation is to be performed. The transformed filter data output by selector 1612 may be used to configure processing elements to implement an appropriate filter.

Transformation elements 1600 includes a non-interlaced output writer (NIOW) unit 1631 and an interlaced output writer (IOW) unit 1632 that receives raw processor element output data. The raw processor output data may include results generated by performing convolution. The interlaced output writer unit 1632 interlaces the results generated by processing elements.

Selector 1613 receives the results from the processing elements and the interlaced results from the interlace output writer unit 1632. The selector 1613 selects the results from the processing elements if a convolution operation is to be performed. The selector 1613 selects the results from the interlaced output writer unit 1632 if either a deconvolution or convolution backpropagation operation is to be performed.

Figure 17:
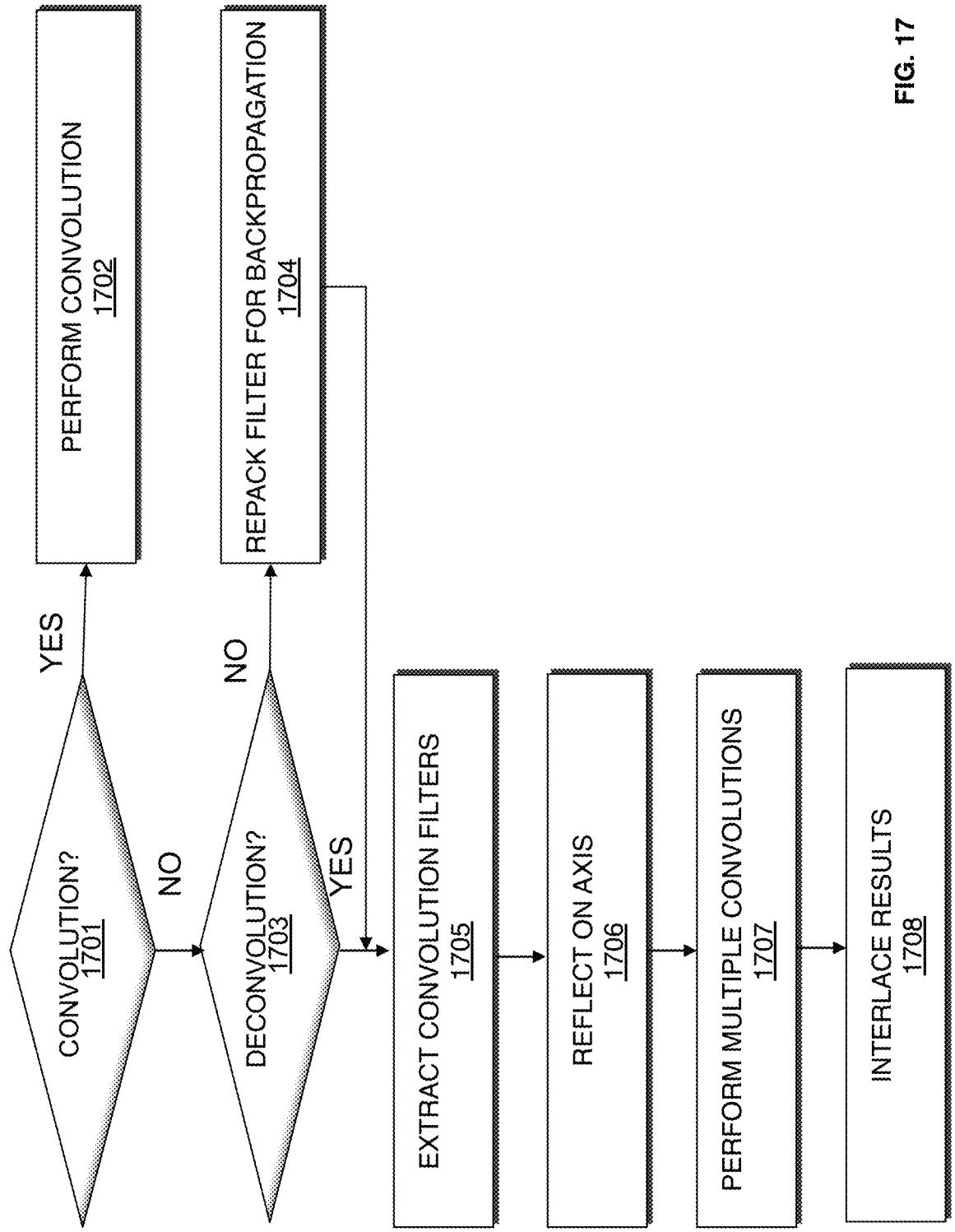
FIG. 17 is a flow chart illustrating a method for supporting a plurality of types of convolution operation utilizing processing elements according to an exemplary embodiment of the present disclosure.

FIG. 17 is a flow chart illustrating a method for supporting a plurality of types of convolution operation utilizing processing elements according to an exemplary embodiment of the present disclosure. The method illustrated in FIG. 17 may be performed in part by transformation elements such as the transformation elements illustrated in FIG. 11B and FIG. 16. At 1701, it is determined whether a convolution operation is to be performed. According to an embodiment of the present disclosure, the determination may be made by a transform controller unit in response to information provided by a sequencer unit, a user, or in data to be processed or from other information. If it is determined that a convolution operation is to be performed control proceeds to 1702. If it is determined that an operation other than a convolution operation is to be performed, control proceeds to 1703.

At 1702, a filter associated with the operation is transmitted to processing elements for convolution. The filter associated with the operation is not modified.

At 1703, it is determined whether a deconvolution operation is to be performed. According to an embodiment of the present disclosure, the determination may be made by a transform controller unit in response to information provided by a sequencer unit, a user, or in data to be processed or from other information. If it is determined that an operation other than a deconvolution operation is to be performed control proceeds to 1704. If it is determined that a deconvolution operation is to be performed, control proceeds to 1705.

At 1704, the filter associated with the operation is repacked. Control proceeds to 1705.

At 1705, convolution filters are extracted from the filter associated with the operation from 1703 or the repacked filter from 1704. It should be appreciated that extracting the convolution filters from a deconvolution filter or repacked filter may be referred to as "breaking the deconvolution filter" or "breaking the repacked filter".

At 1706, the values of the extracted convolution filters are reflected along the x-axis and y-axis.

At 1707, the filter reflected extracted convolution filters are transmitted to processing elements for convolution. It should be appreciated that deconvolution input padded with zeros that is convolved with the extracted convolution filters may be referred to as low resolution input.

At 1708, the results from the convolution are interlaced to generate output data. It should be appreciated that interlacing the results from the convolution may be referred to as "periodic shuffling". The generated output data may be referred to as a high resolution output.

FIG. 17 is a flow chart that illustrates an embodiment of the present disclosure. The procedures described in these figures may be performed by transformation elements and/or other components in a CNN accelerator. Some of the techniques illustrated may be performed sequentially, in parallel or in an order other than that which is described and that the procedures described may be repeated. It is appreciated that not all of the techniques described are required to be performed, that additional techniques may be added, and that some of the illustrated techniques may be substituted with other techniques.

Figure 18:
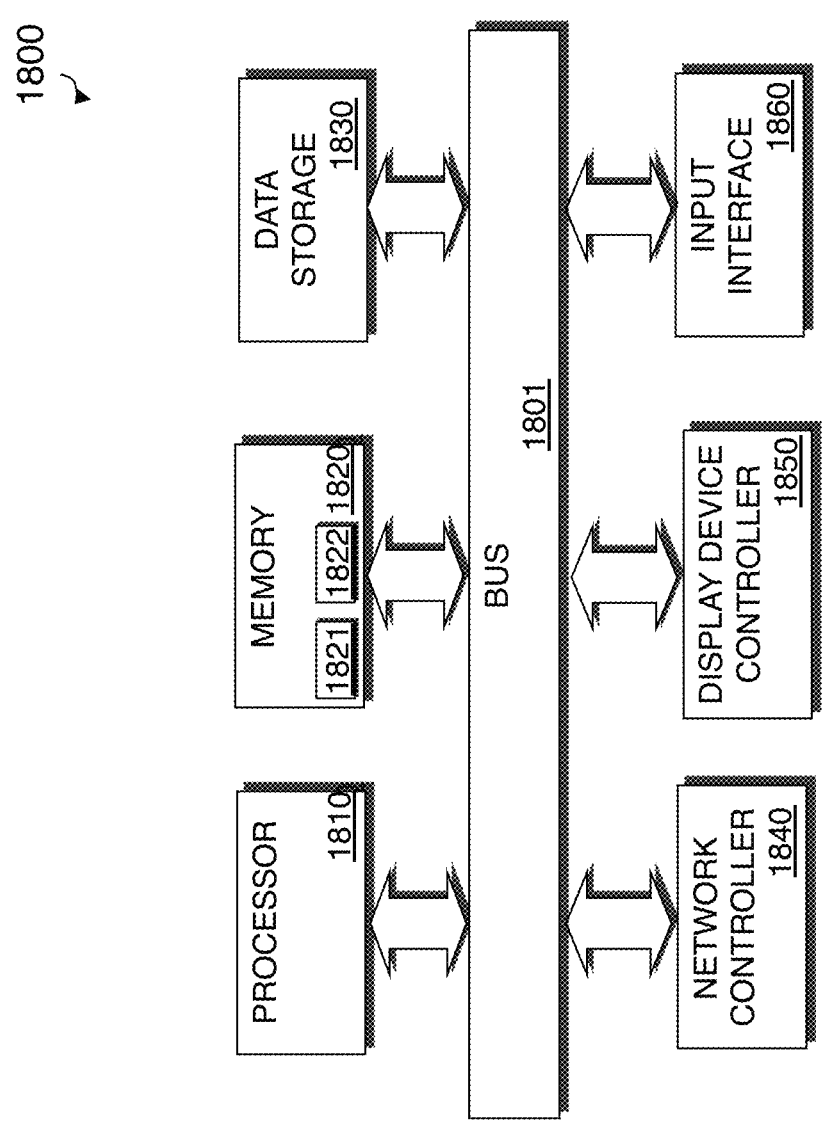
FIG. 18 illustrates a block diagram of a computer system implementing an electronic design automation tool and a CNN accelerator configuration tool according to an exemplary embodiment of the present disclosure.

FIG. 18 illustrates a block diagram of a computer system 1800 implementing a system designer according to an embodiment of the present disclosure. The computer system 1800 includes a processor 1810 that process data signals. The processor 1810 is coupled to a bus 1801 or other switch fabric that transmits data signals between processor 1810 and other components in the computer system 1800. The computer system 1800 includes a memory 1820. The memory 1820 may store instructions and code represented by data signals that may be executed by the processor 1810. A data storage device 1830 is also coupled to the bus 1801.

A network controller 1840 is coupled to the bus 1801. The network controller 1840 may link the computer system 1800 to a network of computers (not shown) and supports communication among the machines. A display device controller 1850 is coupled to the bus 1801. The display device controller 1850 allows coupling of a display device (not shown) to the computer system 1800 and acts as an interface between the display device and the computer system 1800. An input interface 1860 is coupled to the bus 1801. The input interface 1860 allows coupling of an input device (not shown) to the computer system 1800 and transmits data signals from the input device to the computer system 1800.

An EDA tool 1821 may reside in the memory 1820 and be executed by the processor 1810. According to an embodiment of the present disclosure, the EDA tool 1821 operates to identify features of a CNN accelerator which includes characteristics and parameters of the CNN accelerator, and resources of a target that the CNN accelerator is to be implemented on. The EDA tool 1821 generates a design for the CNN accelerator in response to the features of the CNN accelerator and the resources of the target. The EDA tool 1821 may also include transformation elements on the CNN accelerator to allow processing elements on the CNN accelerator to support a plurality of convolution operations such as standard convolution, deconvolution, and convolution backpropagation.

A CNN accelerator configuration tool 1822 may reside in the memory 1820 and be executed by the processor 1810. According to an embodiment of the present disclosure, the CNN accelerator configuration tool 1822 identifies a CNN algorithm to execute on a CNN accelerator, identifies a variation of the CNN accelerator that supports execution of the CNN algorithm, and sets configurable status registers on a target to support the variation of the CNN accelerator.

Figure 19:
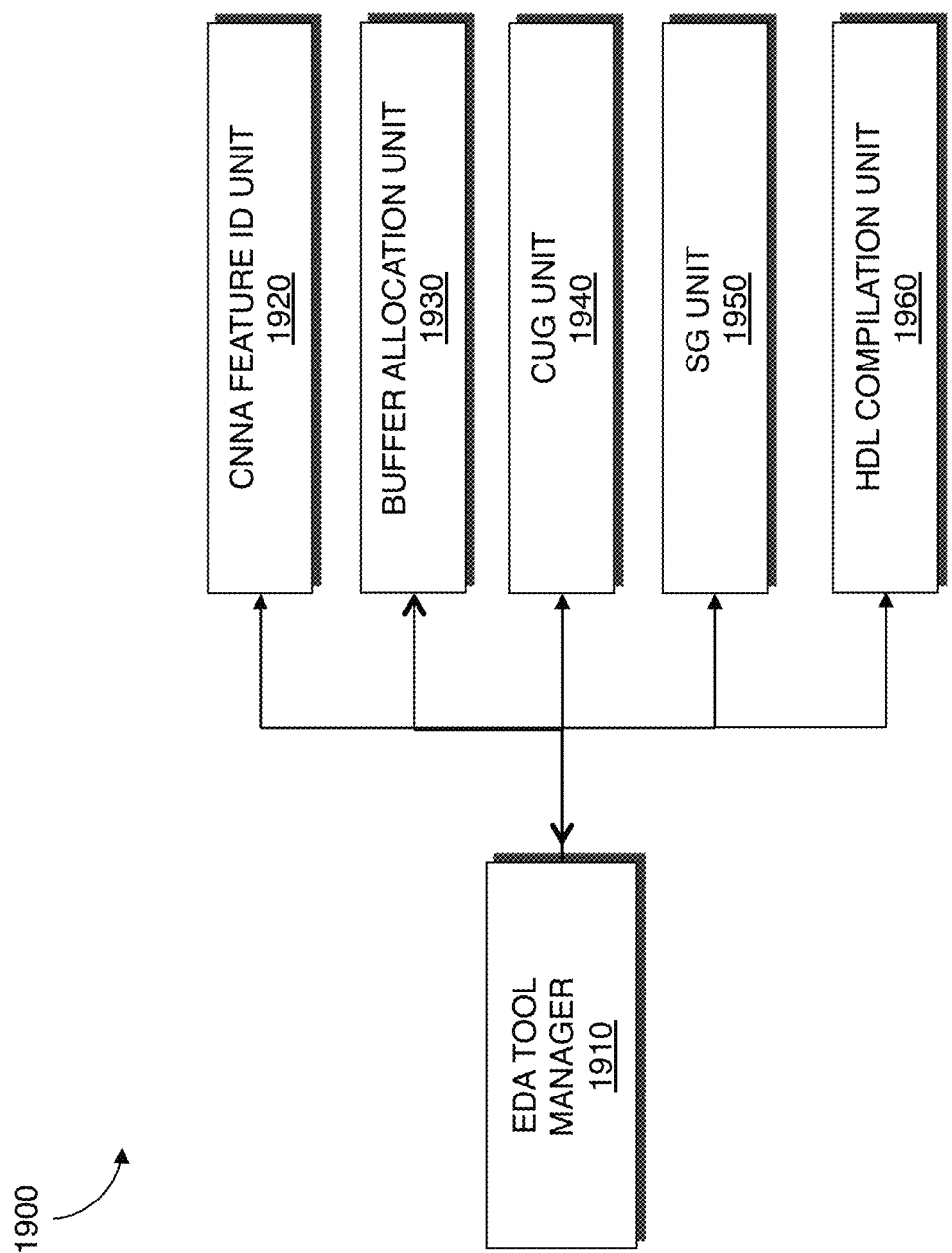
FIG. 19 is a block diagram of an electronic design automation tool according to an exemplary embodiment of the present disclosure.

FIG. 19 illustrates an EDA tool 1900 according to an embodiment of the present disclosure. The EDA tool 1900 may be used to implement the EDA tool 1421 illustrated in FIG. 14. The EDA tool 1900 may be used for designing a system such as a CNN accelerator on one or more target devices such as an FPGA, ASIC, structured ASIC, or other circuitry. FIG. 19 illustrates modules implementing an embodiment of the EDA tool 1900. According to one embodiment, the modules represent software modules and designing a CNN accelerator may be performed by a computer system such as the one illustrated in FIG. 14 executing sequences of instructions represented by the modules shown in FIG. 19. Execution of the sequences of instructions causes the computer system to support system design as will be described hereafter. In alternate embodiments, hard-wire circuitry may be used in place of or in combination with software instructions to implement embodiments of present disclosure. Thus, embodiments of present disclosure are not limited to any specific combination of hardware circuitry and software.

The EDA tool 1900 includes an EDA tool manager 1910. The EDA tool manager 1910 is connected to and transmits data between the other components of the EDA tool 1900. The EDA tool manager 1910 provides an interface that allows a user such as a designer to input data into the EDA tool 1900.

The EDA tool 1900 includes a CNN accelerator feature identification unit 1920. According to an embodiment of the present disclosure, the CNN accelerator feature identification unit 1920 identifies characteristics of the CNN accelerator by identifying characteristics of one or more CNN algorithms that the CNN accelerator is desired to support. The characteristics of a CNN algorithm may include a number and sequence of stages of layers, such as convolution and noise filtering layers. The noise filtering layers may include, for example, pooling, normalization, and ReLU layers. The characteristics of the CNN algorithm may also include sizes and coefficients of filters, and sizes and strides of images to be processed. The CNN feature identification unit 1920 also identifies parameters of the CNN accelerator by identifying parameters for the one or more CNN algorithms that the CNN accelerator is desired to support. The parameters of a CNN algorithm may include a number of kernels to instantiate for each layer identified, and a number of multiplications to execute for each cycle of a kernel, and other parameters. The CNN feature identification unit 1920 also identifies resources available on a target to implement the CNN accelerator. The resources available may include a number and type of memory blocks, DSP blocks, and other components and processing units on a target. According to an embodiment of the present disclosure where a plurality of CNN algorithms are desired to be executed on the CNN accelerator, a range or plurality of characteristics and parameters may be identified for the CNN accelerator.

The EDA tool 1900 includes a buffer allocation unit 1930. According to an embodiment of the present disclosure, the buffer allocation unit 1930 assigns buffers to the CNN accelerator at an appropriate size to support a size of imams to be processed by the CNN accelerator.

The EDA tool 1900 includes a computation unit generation unit 1940. The computation unit generation unit 1940 generates computation units such as processing element arrays to support the CNN algorithms to be performed by the CNN accelerator. According to an embodiment of the present disclosure, the processing element arrays include kernels that perform convolution and noise filtering. The processing element arrays may be generated to optimize performance utilizing resources available on a target used to implement the CNN accelerator.

The EDA tool 1900 includes a sequencer generation unit 1950. The sequencer generation unit 1950 generates and programs a sequencer unit that coordinates transmission of data to appropriate processing element arrays on the CNN accelerator, kernels in the processing element arrays, and components in the kernels at appropriate times in order to time multiplex computations on the processing element arrays. According to an embodiment of the present disclosure, the sequencer unit may be programmed to perform the procedures illustrated with reference to FIGS. 11-13.

According to an embodiment of the present disclosure, information from the buffer allocation unit 1930, computation unit generation unit 1940, and sequencer generation unit 1950 is used to generate a description of the design of the CNN accelerator. The description of the design may be in HDL format or other format.

The EDA tool 1900 includes an HDL compilation unit 1960. The HDL compilation unit 1960 compiles a description of the design for the CNN accelerator for the target. According to an embodiment of the present disclosure, compilation involves performing synthesis, placement, routing, and timing analysis procedures on the HDL description of the design. The compiled design for the CNN accelerator may support a range of CNN variants. It should be appreciated that the EDA tool 1900 may perform the procedures described with reference to FIGS. 1-4.

Figure 20:
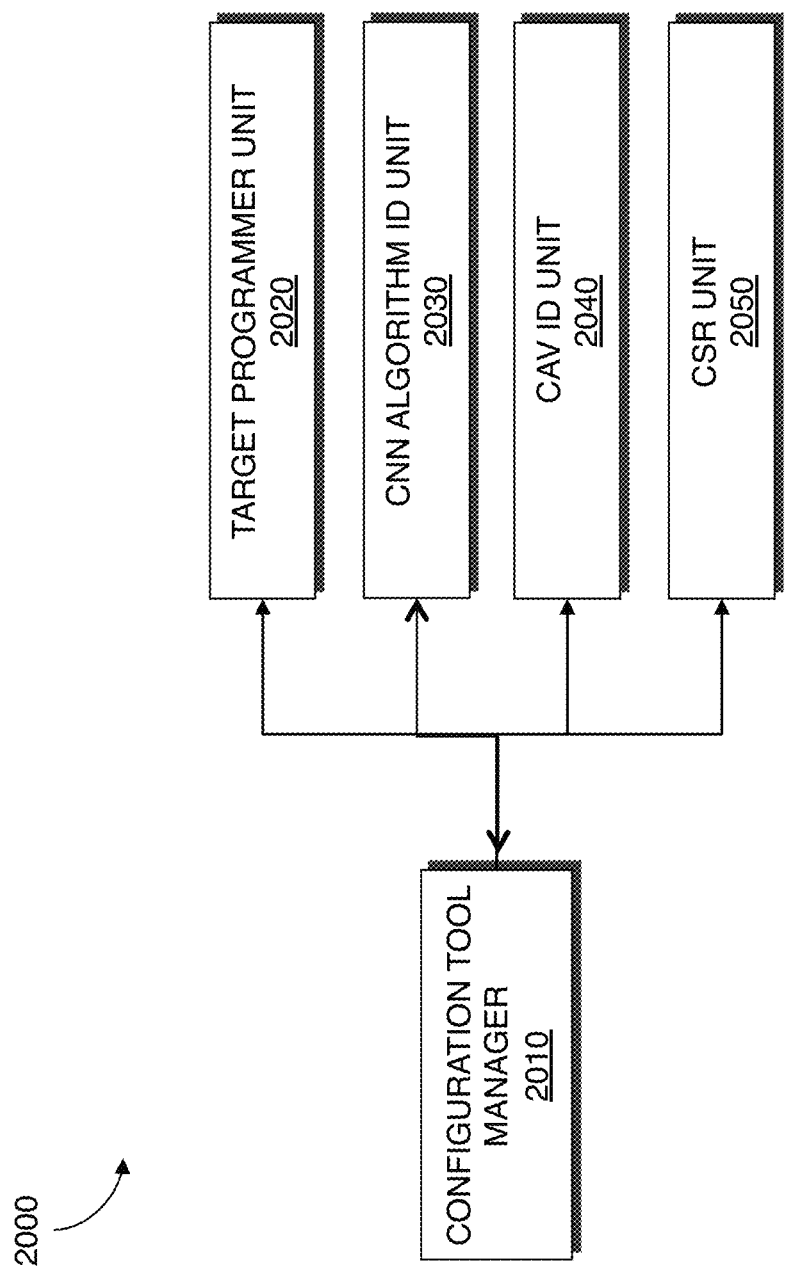
FIG. 20 illustrates a block diagram of a CNN accelerator configuration tool according to an exemplary embodiment of the present disclosure.

FIG. 20 illustrates a CNN accelerator configuration tool 2000 according to an embodiment of the present disclosure. The CNN accelerator configuration tool 2000 may be used to implement the configuration tool 1722 illustrated in FIG. 17. The CNN accelerator configuration tool 2000 may be used to configure a system such as a CNN accelerator on one or more target devices such as an FPGA, ASIC, structured ASIC, or other circuitry. FIG. 20 illustrates modules implementing an embodiment of the CNN accelerator configuration tool 2000. According to one embodiment, the modules represent software modules and configuring a CNN accelerator may be performed by a computer system such as the one illustrated in FIG. 17 executing sequences of instructions represented by the modules shown in FIG. 20. Execution of the sequences of instructions causes the computer system to support configuration of a CNN accelerator as will be described hereafter. In alternate embodiments, hard-wire circuitry may be used in place of or in combination with software instructions to implement embodiments of present disclosure. Thus, embodiments of present disclosure are not limited to any specific combination of hardware circuitry and software.

The CNN accelerator configuration tool 2000 includes a configuration tool manager 2010. The configuration tool manager 2010 is connected to and transmits data between the other components of the configuration tool manager 2000. The configuration tool manager 2010 provides an interface that allows a user to input data into the configuration tool 2000.

The CNN accelerator configuration tool 2000 includes a target programmer unit 2020. The target programmer unit 2020 programs the target to implement a CNN accelerator. According to an embodiment of the present disclosure, programming the target involves programming one or more target devices with a configuration file that physically transforms the one or more target devices into the design of the CNN accelerator.

The CNN accelerator configuration tool 2000 includes a CNN algorithm identification unit 2030. The CNN algorithm identification unit 2030 identifies a CNN algorithm to be executed by the CNN accelerator. According to an embodiment of the present disclosure, the CNN algorithm to be executed may be identified from user input or from another source.

The CNN accelerator configuration tool 2000 includes a CNN accelerator variation identification unit 2040. The CNN accelerator variation identification unit 2040 identifies an appropriate variation of the CNN accelerator that supports the CNN algorithm to be executed, According to an embodiment of the present disclosure, the appropriate variation of the CNN accelerator may be identified from user input or from another source.

The CNN accelerator configuration tool 2000 includes a configurable status register unit 2050. The configurable status register unit 2050 sets one or more configurable status registers to support the variation of the CNN accelerator identified, According to an embodiment of the present disclosure, setting a configurable status register may add or subtract a convolution layer on the CNN accelerator, add or subtract one or more pooling layers, or change a size of a filter.

It should be appreciated that the CNN algorithm identification unit 2030 may make a determination as to whether a new CNN algorithm is to be executed by the CNN accelerator. If a determination is made that a new CNN algorithm is to be executed by the CNN accelerator, an appropriate CNN accelerator variation may be identified by configuration accelerator variation identification unit 2040, and configurable status registers may be set by the configurable status register unit 2050 to support the CNN accelerator variation. It should be appreciated that the CNN accelerator configuration tool 2000 may perform the procedures described with reference to FIG. 7.

It should be appreciated that embodiments of the present disclosure may be provided as a computer program product, or software, that may include a computer-readable or machine-readable medium having instructions. The instructions on the computer-readable or machine-readable medium may be used to program a computer system or other electronic device. The machine-readable medium may include, but is not limited to, floppy diskettes, optical disks, CD-ROMs, and magneto-optical disks or other type of media/machine-readable medium suitable for storing electronic instructions. The techniques described herein are not limited to any particular software configuration. They may find applicability in any computing or processing environment. The terms "computer-readable medium" or "machine-readable medium" used herein shall include any medium that is capable of storing or encoding a sequence of instructions for execution by the computer and that cause the computer to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

Figure 21:
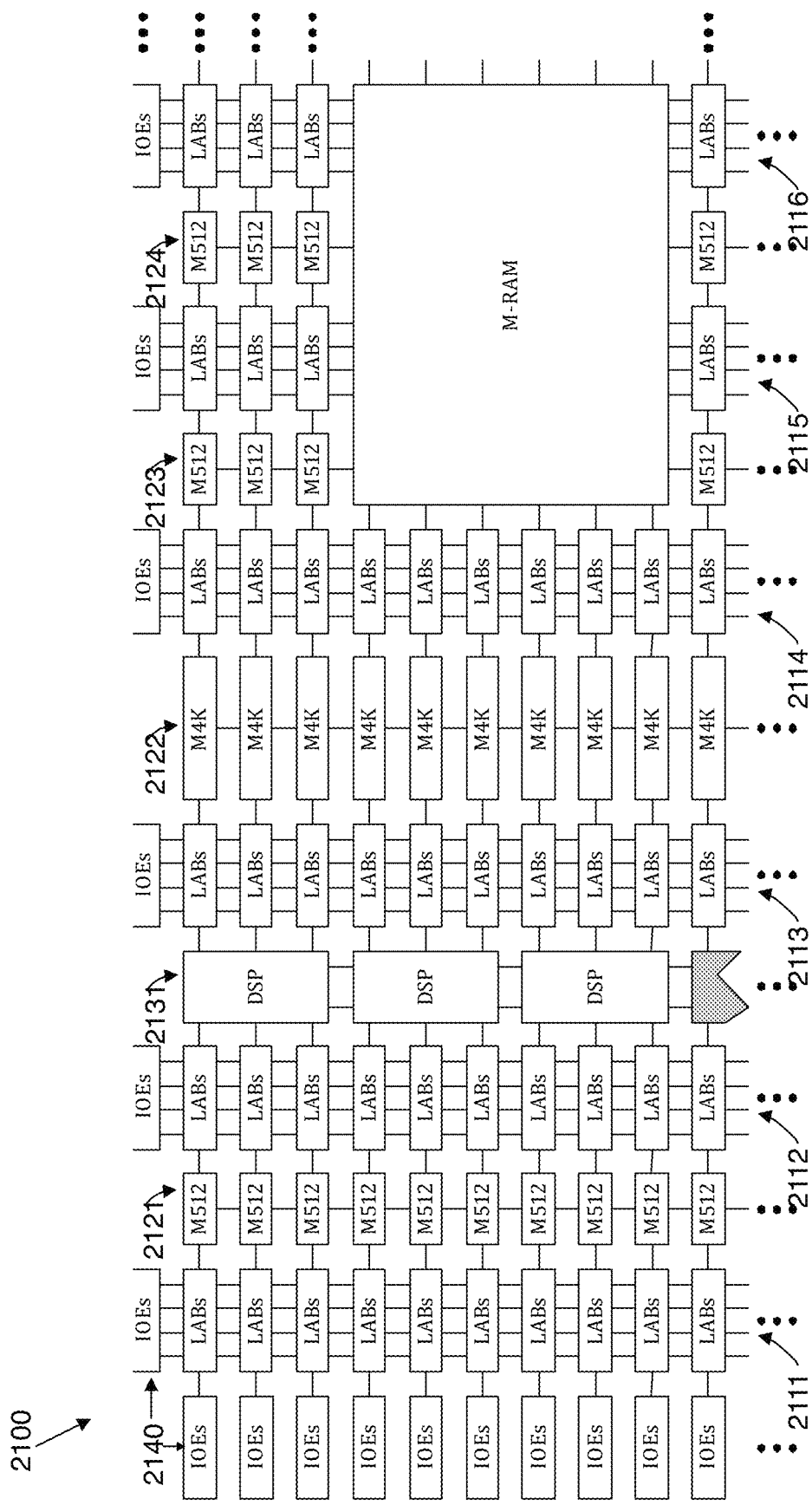
FIG. 21 illustrates an exemplary target device according to an embodiment of the present disclosure.

FIG. 21 illustrates a device 2100 that may be used to implement a target device according to an embodiment of the present disclosure. The device 2100 is a field programmable gate array (FPGA) that includes a plurality of logic-army blocks (LABS). Each LAB may be formed from a plurality of logic blocks, carry chains, LAB control signals, look up table (LUT) chain, and register chain connection lines, and other components and interconnects. A logic block is a small unit of logic providing efficient implementation of user logic functions. A logic block includes one or more combinational cells, where each combinational cell has a single output, and registers. According to one embodiment of the present disclosure, the logic block may operate similarly to a logic element (LE), such as those found in the Stratix or Cyclone devices manufactured by Altera® Corporation now owned by Intel Corporation, or a combinational logic block (CLB) such as those found in Virtex devices manufactured by Xilinx Inc. In this embodiment, the logic block may include a four input LUT with a configurable register. According to an embodiment of the present disclosure, the logic block may include one or more adaptive logic modules (ALMs), such as those found in Stratix devices manufactured by Altera Corporation. ALMs may be configured to implement logic functions, arithmetic functions, and register functions. LABs are grouped into rows and columns across the device 2100. Columns of LABs are shown as 2111-2116. It should be appreciated that the logic block may include additional or alternate components.

The device 2100 includes memory blocks. The memory blocks may be, for example, dual port random access memory (RAM) blocks that provide dedicated true dual-port, simple dual-port, or single port memory up to various bits wide at up to various frequencies. The memory blocks may be grouped into columns across the device in between selected LABs or located individually or in pairs within the device 2100. Columns of memory blocks are shown as 2121-2124. According to an embodiment of the present disclosure, CSRs may be implemented by one or more of the memory blocks in columns 2121-2124. The CSRs may be used to provide status to kernels in order to configure a CNN accelerator according to desired features of a CNN. This allows a CNN accelerator implemented by the target device 2100 to be configured during runtime.

The device 2100 includes digital signal processing (DSP) blocks. The DSP blocks may be used to implement multipliers of various configurations with add or subtract features. The DSP blocks include shift registers, multipliers, adders, and accumulators. The DSP blocks may be grouped into columns across the device 2100 and are shown as 2131.

The device 2100 includes a plurality of input/output elements (IOEs) 2140. Each IOE feeds an IO pin (not shown) on the device 2100. The IOEs 2140 are located at the end of LAB rows and columns around the periphery of the device 2100. Each IOE may include a bidirectional IO buffer and a plurality of registers for registering input, output, and output-enable signals.

The device 2100 may include routing resources such as LAB local interconnect lines, row interconnect ("H-type wires"), and column interconnect lines ("V-type wires") (not shown) to route signals between components on the target device.

In the foregoing specification, embodiments of the disclosure have been described with reference to specific exemplary embodiments thereof. It will, however, be evident that various modifications and changes may be made thereto without departing from the broader spirit and scope of the embodiments of the disclosure. The specification and drawings are, accordingly, to be regarded in an illustrative rather than restrictive sense.

What is claimed is:

1. A method for implementing a convolutional neural network (CNN) accelerator on a target, comprising:
   determining whether a deconvolution operation is to be performed;
   extracting a plurality of convolution filters from a deconvolution filter associated with the deconvolution operation;
   utilizing one or more processing elements to perform convolution on deconvolution input data using the plurality of convolution filters to generate convolution results;
   interlacing the convolution results to produce deconvolution output data;
   reformatting a convolution filter to a backpropagation convolution filter;
   generating an additional plurality of convolution filters from the backpropagation convolution filter; and
   interlacing additional convolution results, generated from performing convolution on backpropagation convolution input data using the additional plurality of convolution filters, to produce backpropagation convolution output data.

2. The method of claim 1 further comprising:
   utilizing the one or more processing elements to perform deconvolution.

3. The method of claim 1, wherein extracting the plurality of convolution filters from the deconvolution filter comprises:
   extracting smaller convolution filters from the deconvolution filter based on stride; and
   reflecting each of the smaller convolution filters along x and y axes.

4. The method of claim 1, wherein reformatting the convolution filter comprises repacking the convolution filter by transforming a convolution layer having k filters of depth c to c filters of depth k.

5. The method of claim 1, wherein extracting the plurality of convolution filters from the deconvolution filter is performed during runtime of the CNN accelerator by transformation elements residing on the CNN accelerator.

6. The method of claim 1, wherein extracting the plurality of convolution filters from the deconvolution filter is performed prior to runtime of the CNN accelerator.

7. The method of claim 1, wherein the one or more processing elements performs convolution, deconvolution, and backward propagation convolution at different instances of time.

8. The method of claim 1, wherein each of the processing elements comprises:
   a cache;
   a computation unit that performs dot product operations; and
   an accumulation unit.

9. A convolutional neural network (CNN) accelerator implemented on a target, comprising:
   a sequencer unit that coordinates a first data flow between components on the target during a first configuration and that coordinates a second data flow between the components on the target during a second configuration;
   transformation elements comprising a convolution filter extraction unit that generates a plurality of convolution filters from a deconvolution filter; and
   a plurality of processing elements that performs convolution on deconvolution input data using the plurality of convolution filters to generate convolution results during the first configuration, and that performs one of deconvolution and backpropagation convolution during the second configuration,
   wherein the transformation elements further comprise an interlacing unit that interlaces the convolution results to produce deconvolution output data.

10. The CNN accelerator of claim 9 further comprising:
    a CNN algorithm identification unit that identifies a CNN algorithm to be executed by the CNN accelerator.

11. The CNN accelerator of claim 9, wherein the transformation elements further comprise:
    a filter repacking unit that reformats a convolution filter to a backpropagation convolution filter,
    wherein the convolution filter extraction unit generates an additional plurality of convolution filters from the backpropagation convolution filter; and
    wherein the interlacing unit interlaces additional convolution results, generated from performing convolution on backpropagation convolution input data using the additional plurality of convolution filters, to produce backpropagation convolution output data.

12. The CNN accelerator of claim 9, wherein the convolution filter extraction unit generates the plurality of convolution filters from the deconvolution filter during runtime of the CNN accelerator.

13. The CNN accelerator of claim 11, wherein the convolution filter extraction unit generates the additional plurality of convolution filters from the backpropagation convolution filter during runtime of the CNN accelerator.

14. The CNN accelerator of claim 9, wherein the one or more processing elements performs convolution, deconvolution, and backward propagation convolution at different instances of time.

15. The CNN accelerator of claim 9, wherein each of the processing elements comprises:
    a cache;
    a computation unit that performs dot product operations; and
    an accumulation unit.

16. A non-transitory computer readable medium including a sequence of instructions stored thereon for causing a computer to execute a method for implementing a convolutional neural network (CNN) accelerator on a target, comprising:
- reformatting a convolution filter to a backpropagation convolution filter;
- generating a plurality of convolution filters from the backpropagation convolution filter;
- utilizing one or more processing elements to perform convolution on backpropagation convolution input data using the plurality of convolution filters to generate convolution results; and
- interlacing the convolution results to produce backpropagation convolution output data.

17. The non-transitory computer readable medium of claim 16 further comprising:
- utilizing the one or more processing elements to perform backpropagation convolution.

18. The non-transitory computer readable medium of claim 16, wherein the one or more processing elements performs convolution, deconvolution, and backward propagation convolution at different instances of time.

19. The non-transitory computer readable medium of claim 16 further comprising:
- generating an additional plurality of convolution filters from a deconvolution filter; and
- interlacing additional convolution results, generated from performing convolution on deconvolution input data using the additional plurality of convolution filters, to produce deconvolution output data.

* * * * *